(12) United States Patent
Banning

(10) Patent No.: US 7,781,026 B2
(45) Date of Patent: *Aug. 24, 2010

(54) INK COMPOSITIONS

(75) Inventor: Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 667 days.

This patent is subject to a terminal disclaimer.

(21) Appl. No.: 11/641,313

(22) Filed: Dec. 19, 2006

(65) Prior Publication Data

US 2008/0145558 A1 Jun. 19, 2008

(51) Int. Cl.
C09D 11/02 (2006.01)

(52) U.S. Cl. .................. 427/466; 106/31.49; 106/31.29

(58) Field of Classification Search .................. 427/466
See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,221,335 A | 6/1993 | Williams et al. | |
| 5,372,852 A | 12/1994 | Titterington et al. | |
| 5,496,879 A | 3/1996 | Griebel et al. | |
| 5,621,022 A | 4/1997 | Jaeger et al. | |
| 6,248,804 B1 * | 6/2001 | Lutz | 523/160 |
| 6,472,523 B1 | 10/2002 | Banning et al. | |
| 6,476,219 B1 | 11/2002 | Duff et al. | |
| 6,726,755 B2 | 4/2004 | Titterington et al. | |
| 2004/0261656 A1 * | 12/2004 | Wu et al. | 106/31.29 |
| 2004/0261657 A1 * | 12/2004 | Wu et al. | 106/31.29 |
| 2007/0123606 A1 * | 5/2007 | Toma et al. | 523/160 |
| 2008/0146795 A1 * | 6/2008 | Banning | 540/140 |

FOREIGN PATENT DOCUMENTS

EP 0 206 286 B1 5/1990
EP 0 187 352 B1 6/1991
JP 11254827 * 9/1999
WO WO 94/04619 3/1994

OTHER PUBLICATIONS

English abstract for DE4205636.
English abstract for DE4205713.
Copending U.S. Appl. No. 11/641,576, filed Dec. 19, 2006, entitled "Colorant Compounds," by Jeffrey H. Banning.

* cited by examiner

*Primary Examiner*—Melvin C Mayes
*Assistant Examiner*—Yun Qian
(74) *Attorney, Agent, or Firm*—Oliff & Berridge, PLC

(57) ABSTRACT

Disclosed is a phase change ink composition comprising a phase change ink carrier and a colorant compound of the formula

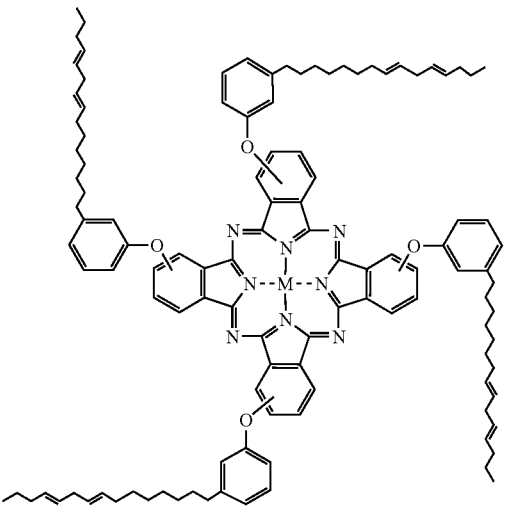

wherein M is an atom or group of atoms capable of bonding to the central cavity of a phthalocyanine molecule, wherein axial ligands optionally can be attached to M. Also disclosed is a radiation curable ink composition comprising (a) an ink vehicle, said ink vehicle comprising at least one radically curable monomer compound, and this colorant compound.

51 Claims, No Drawings

INK COMPOSITIONS

BACKGROUND

Disclosed herein are ink compositions. More specifically, disclosed herein are ink compositions containing phthalocyanine colorant compounds. One embodiment is directed to a phase change ink composition comprising a phase change ink carrier and a colorant compound of the formula

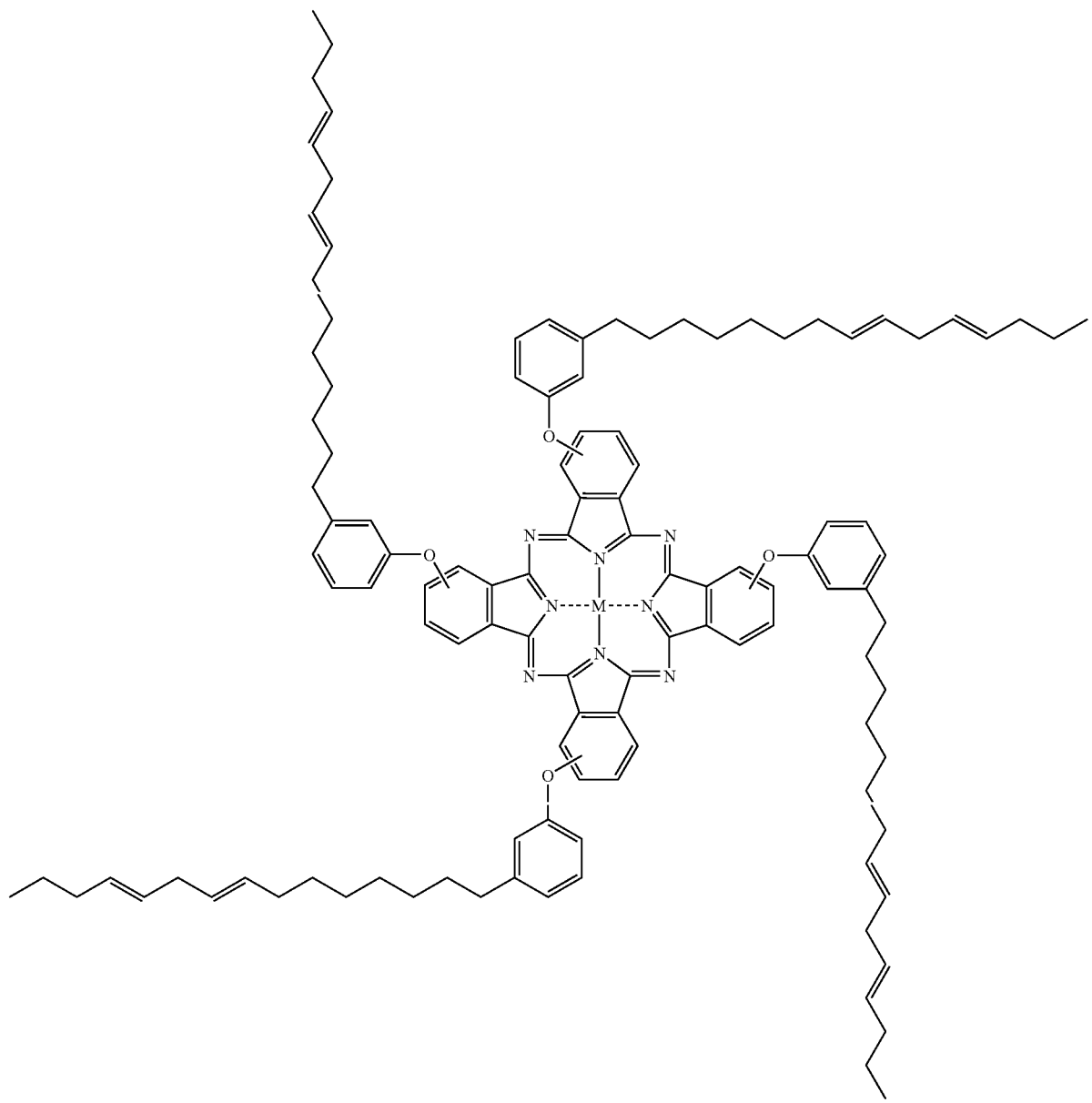

wherein M is an atom or group of atoms capable of bonding to the central cavity of a phthalocyanine molecule, wherein axial ligands optionally can be attached to M. Also disclosed are printing processes using the phase change inks.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,472,523 (Banning et al.), U.S. Pat. No. 6,726,755 (Titterington et al.), and U.S. Pat. No. 6,476,219 (Duff et al.), the disclosures of each of which are incorporated herein by reference, disclose a compound of the formula

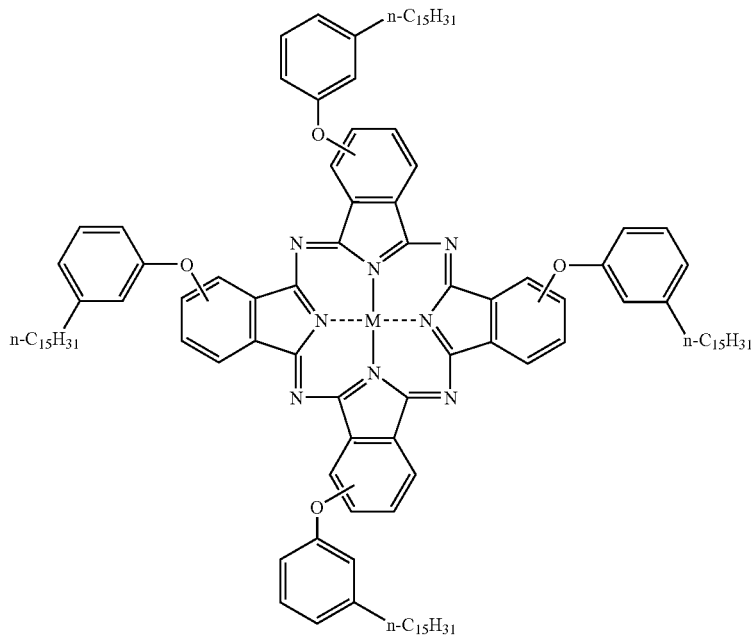

wherein M is an atom or group of atoms capable of bonding to the central cavity of a phthalocyanine molecule, wherein axial ligands optionally can be attached to M. U.S. Pat. No. 6,726,755 further discloses a phase change ink composition comprising a phase change ink carrier and this colorant compound. U.S. Pat. No. 6,476,219 further discloses methods for preparing these compounds.

While known compositions and processes are suitable for their intended purposes, a need remains for improved colorant compositions. In addition, a need remains for improved phthalocyanine compositions. Further, a need remains for colorants suitable for use in phase change inks. Additionally, a need remains for colorants that enable good to excellent lightfastness. There is also a need for improved colorants having improved cyan color for primary subtractive imaging. In addition, there is a need for improved colorants having high tinctorial power or spectral strength. Further, there is a need for improved cyan phase change ink colorants that are highly thermally stable in ink compositions for several weeks in air at temperatures exceeding 140° C. Additionally, there is a need for phase change ink colorants with low diffusion characteristic that will not bleed into inks containing other colorants. A need also remains for colorants with good to excellent lightfastness that are compatible with phase change ink vehicles. In addition, a need remains for colorants suitable for use in phase change inks that exhibit reduced or no variation in color over the life of the ink in the printer. Further, a need remains for colorants suitable for use in phase change inks that exhibit reduced or no variation in color subsequent to being deposited in imagewise fashion on substrates. Additionally, a need remains for colorants that have no carcinogenic or mutagenic effects. There is also a need for colorants that, when dissolved in phase change ink carriers, do not leave residues of material that might otherwise complicate filtration efficiency. In addition, there is a need for colorants that can react with other unsaturated moieties in ink carriers to enable radiation curable inks.

SUMMARY

Disclosed herein is a phase change ink composition comprising a phase change ink carrier and a colorant compound of the formula

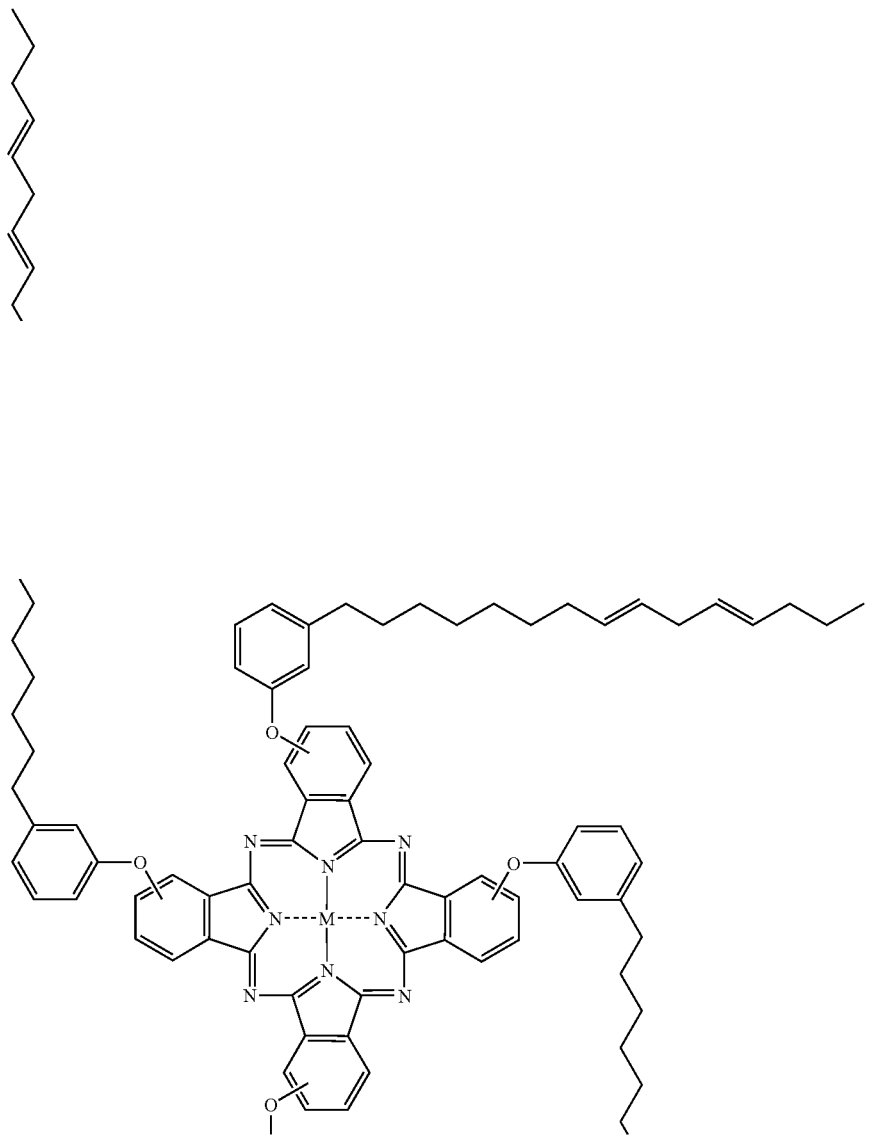

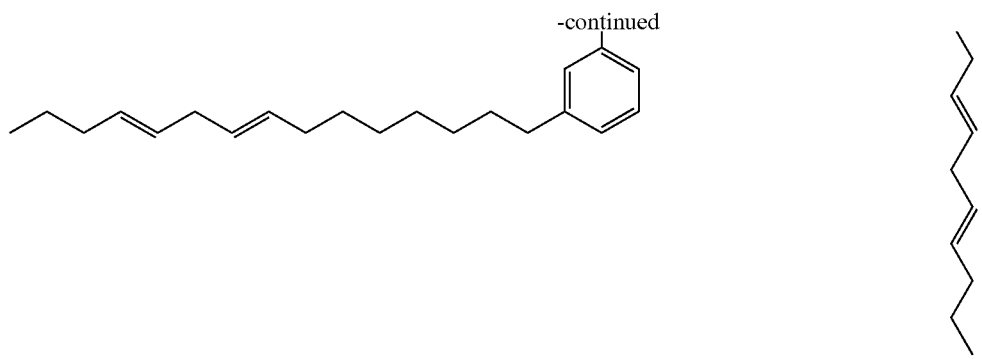
wherein M is an atom or group of atoms capable of bonding to the central cavity of a phthalocyanine molecule, wherein axial ligands optionally can be attached to M.
DETAILED DESCRIPTION
The colorant compounds disclosed herein are of the formula
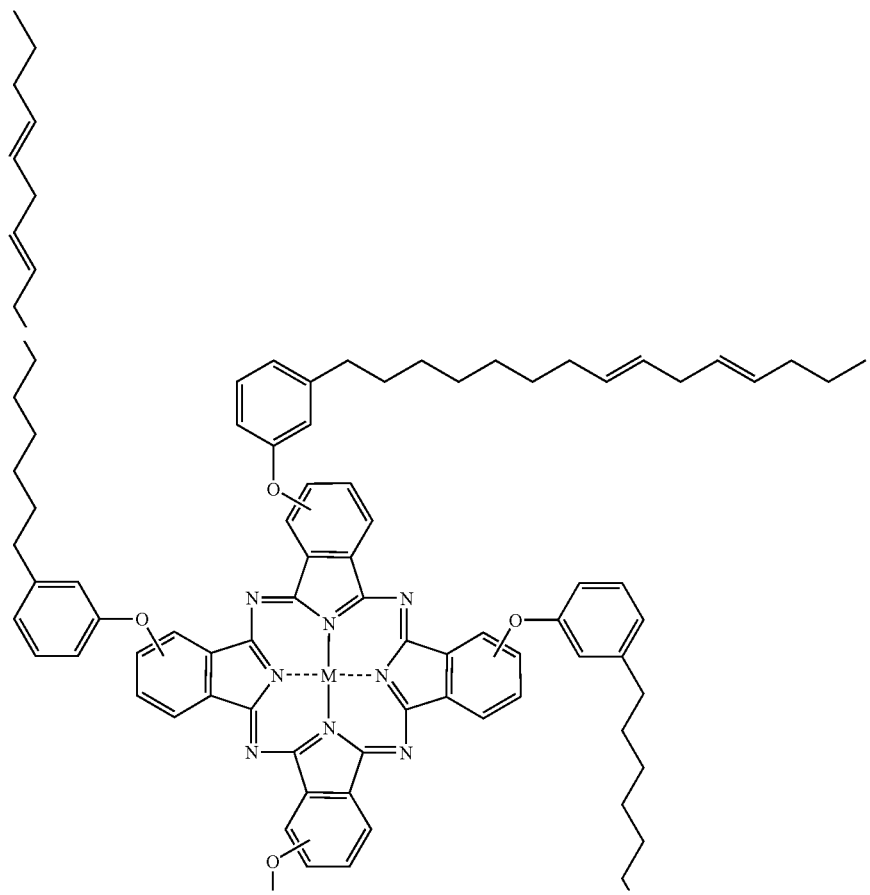

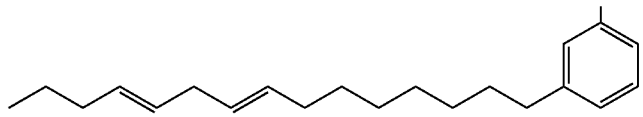

wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference, including, but not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron(III), chlorotitanium(III), chlorochromium(III), chloroaluminum, chlorogallium, chloroindium, chlorophosphorus (III), dichlorotitanium(IV), dichlorosilicon, dichlorogermanium, dichlorotin, and the like, as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

It is believed that in most instances the colorant molecules are obtained as mixtures of four isomeric forms as illustrated below, wherein the $C_{4h}$, $D_{2h}$, $C_{2v}$, and $C_s$ isomers are present in the approximate ratio of, respectively, about 1:1:2:4:

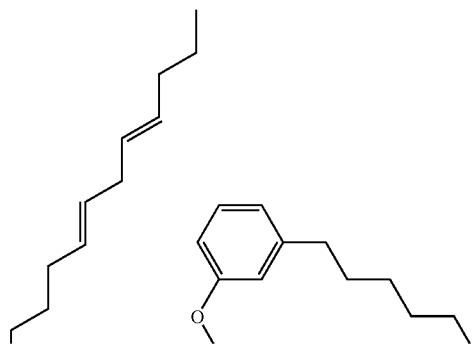

-continued
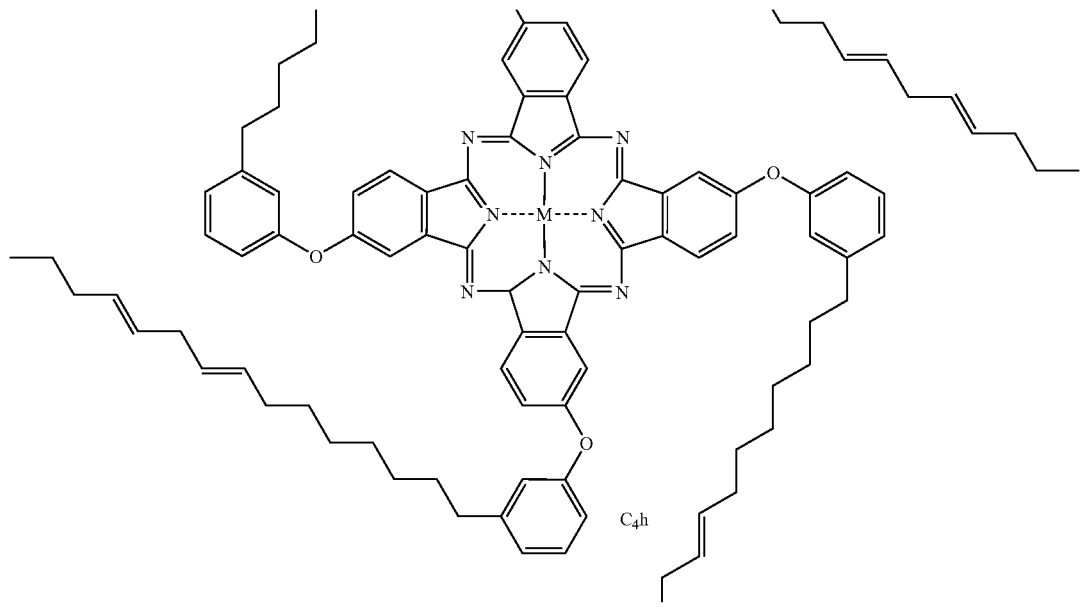
C₄ₕ
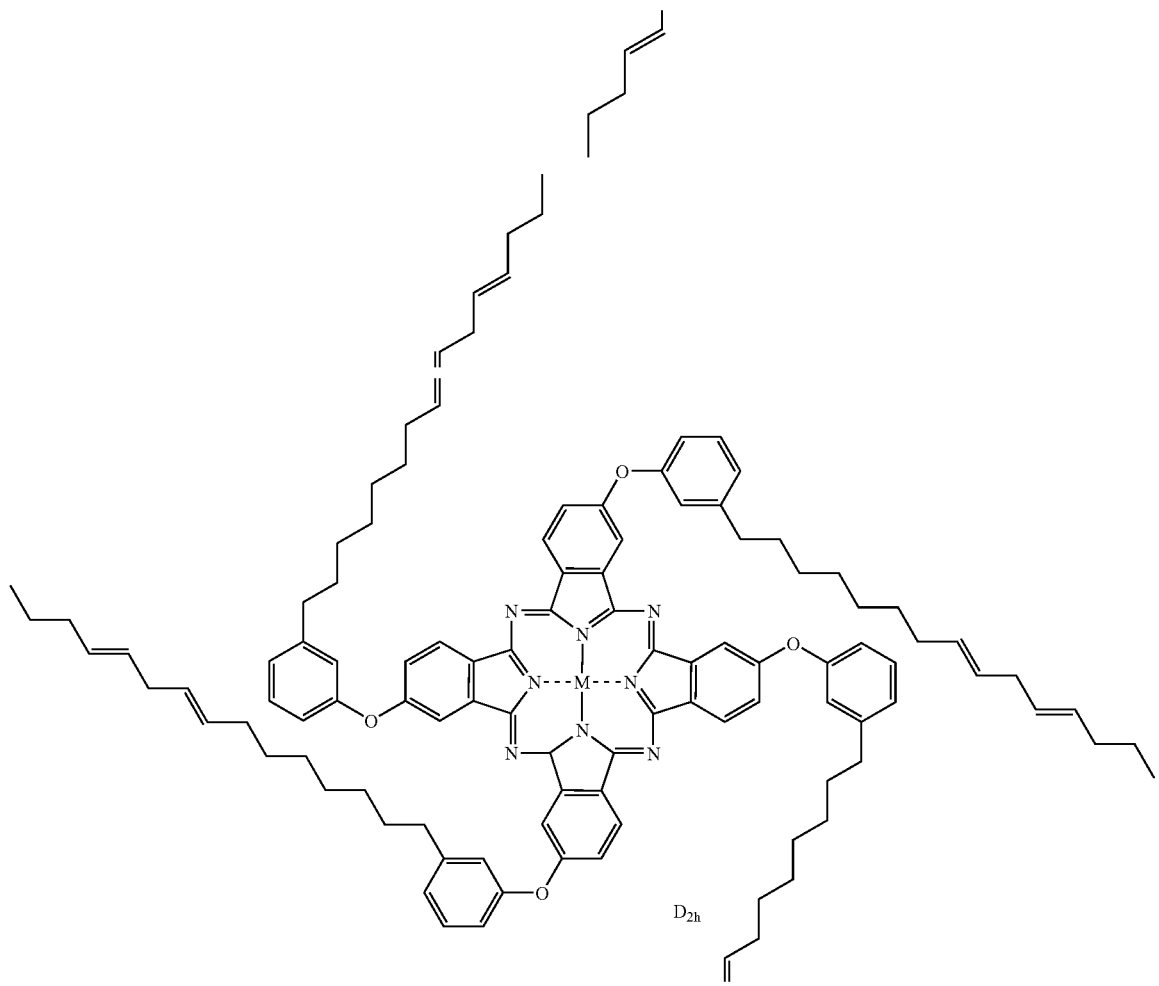
D₂ₕ

-continued
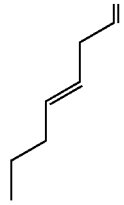
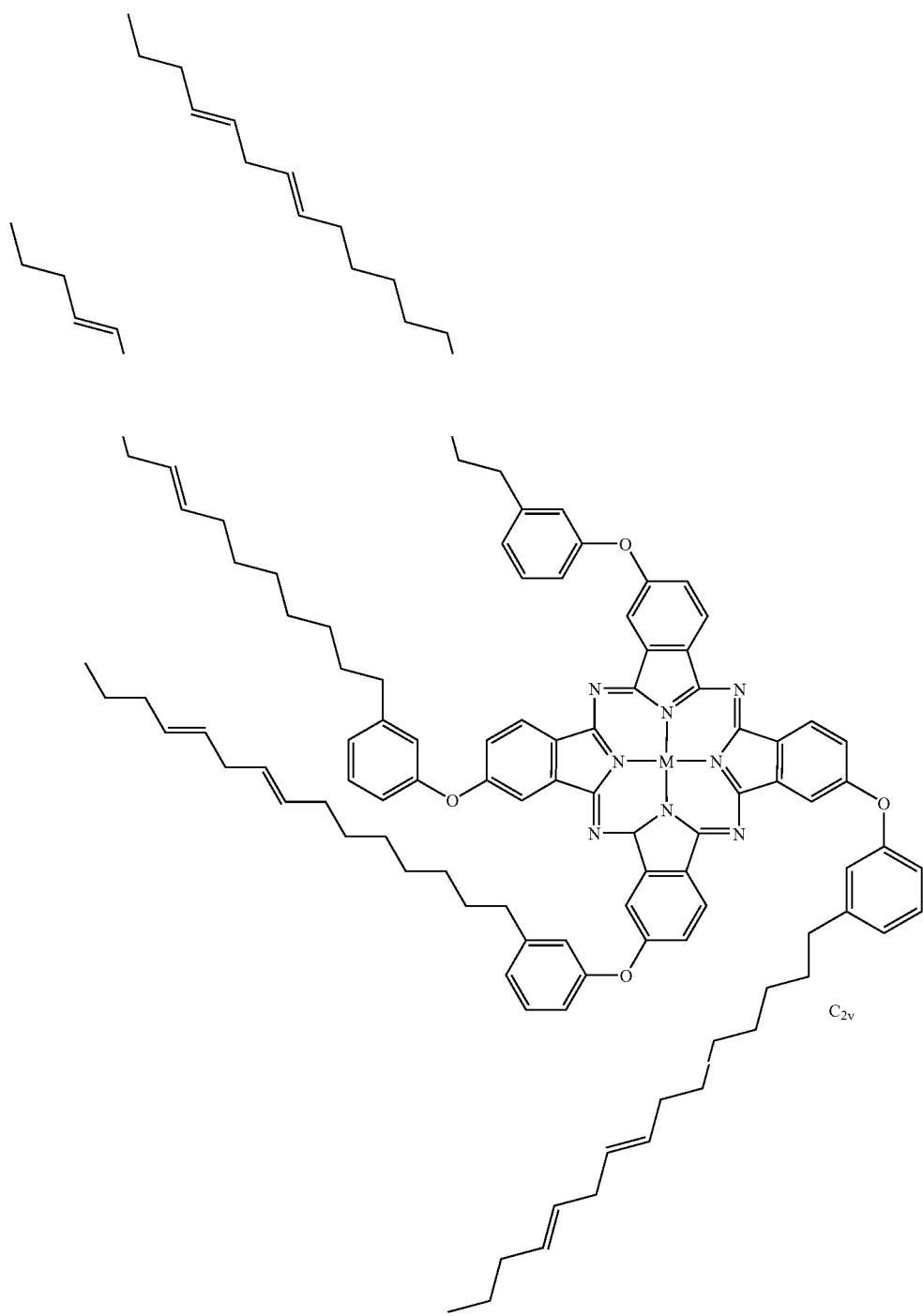

-continued
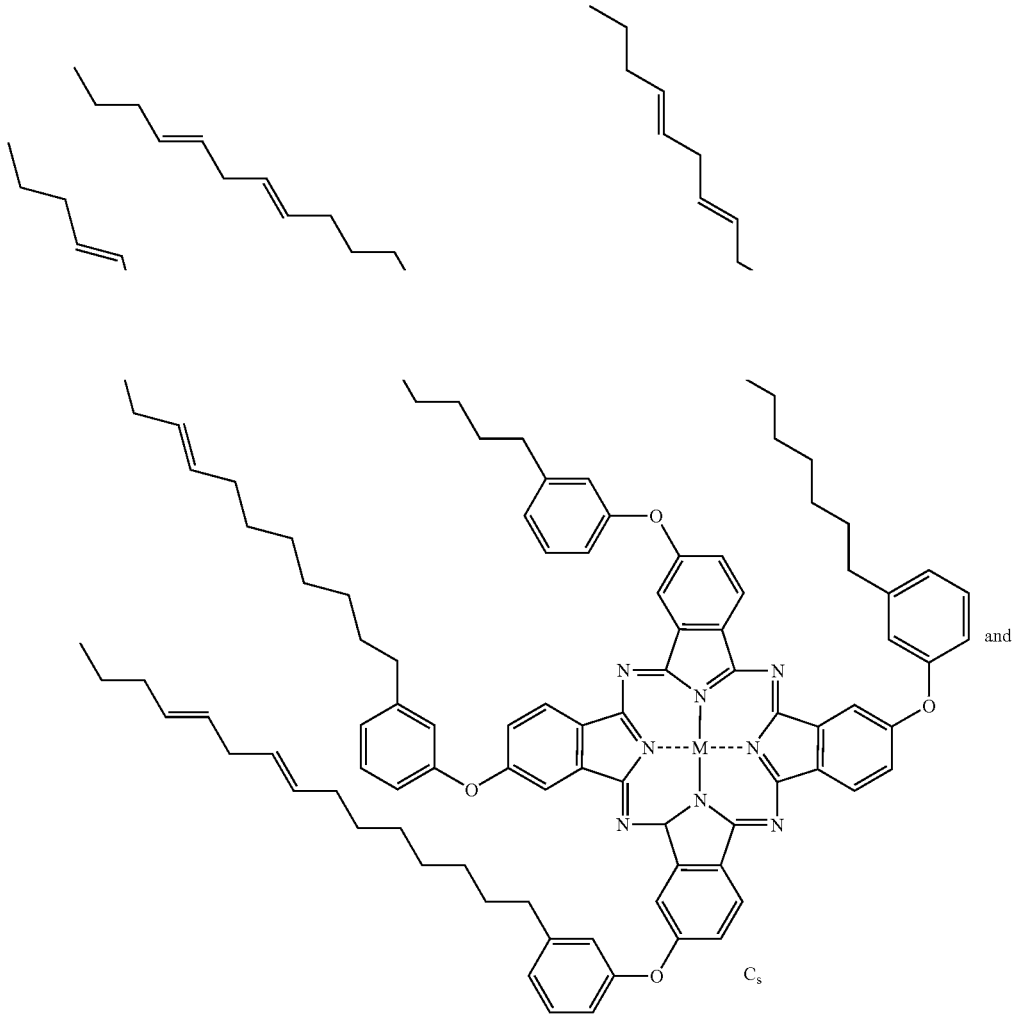
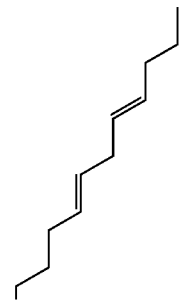

-continued
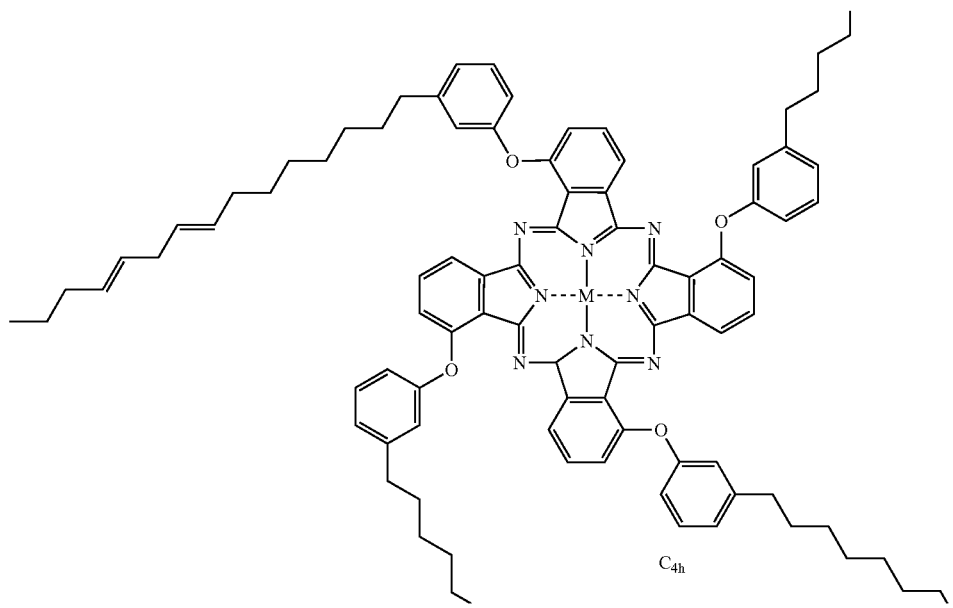
C_{4h}
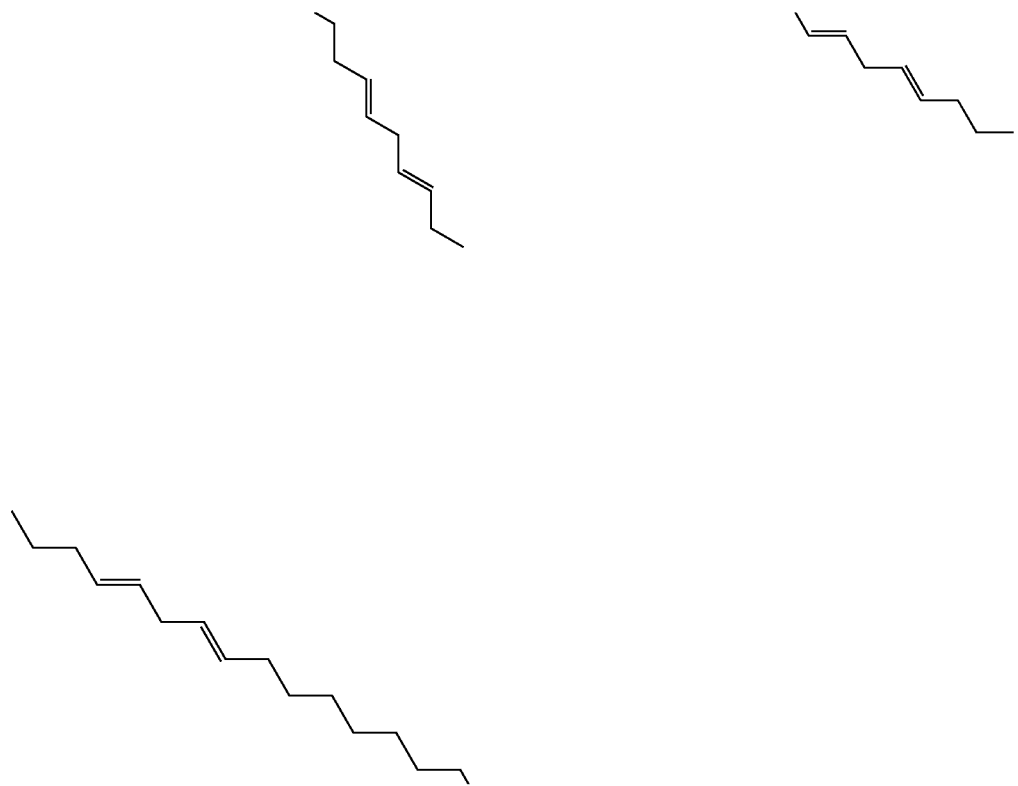

-continued
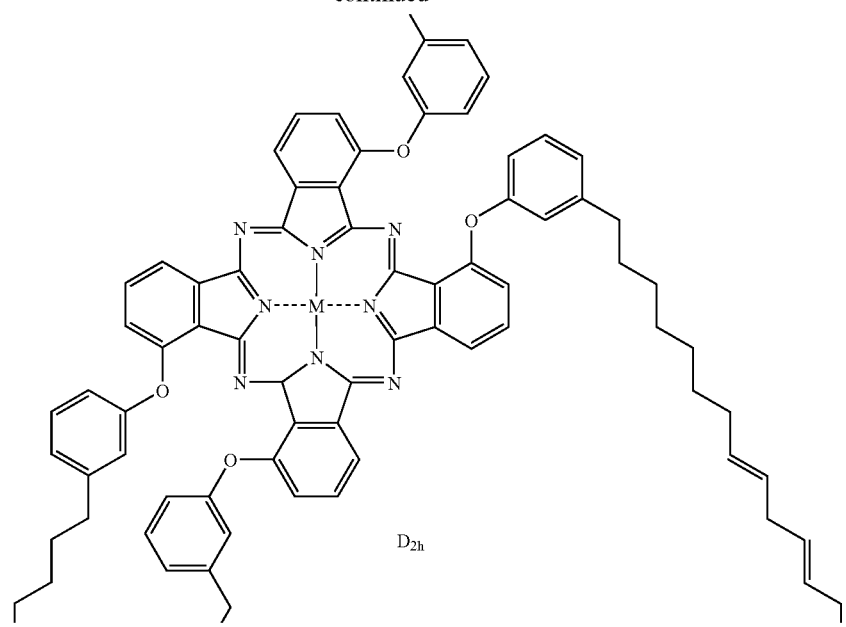
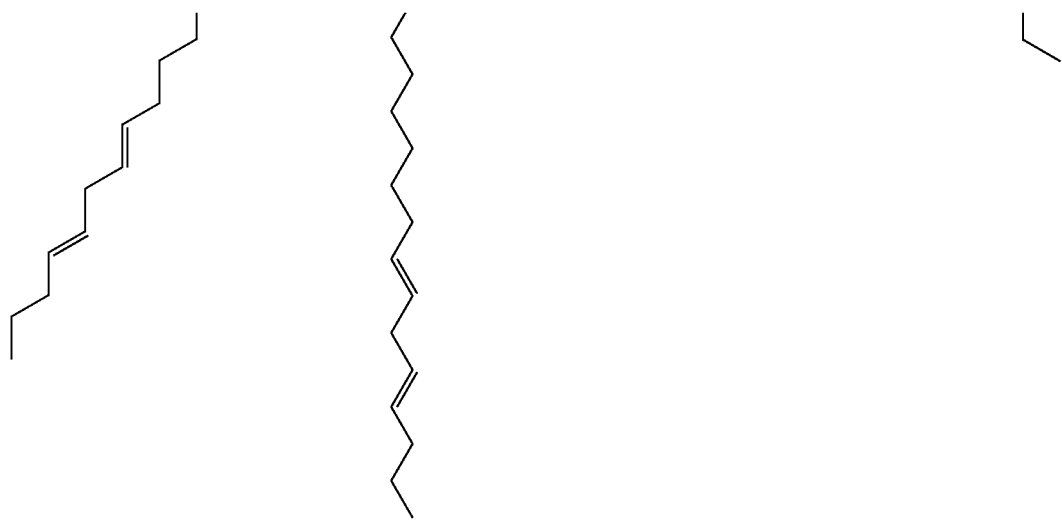
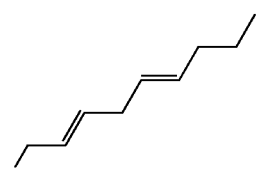

-continued
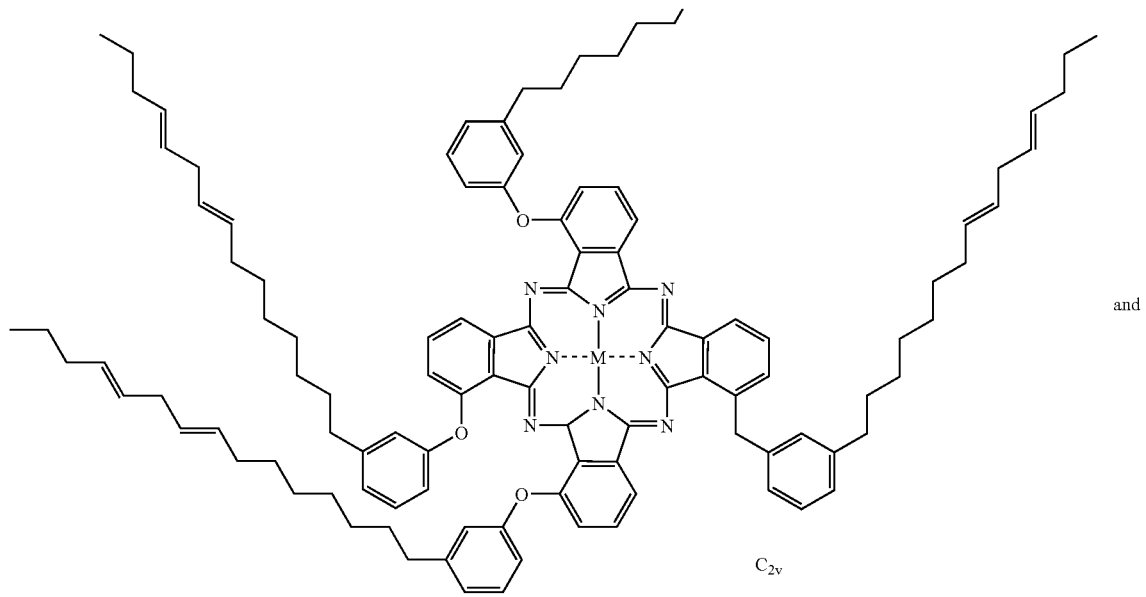
$C_{2v}$
and
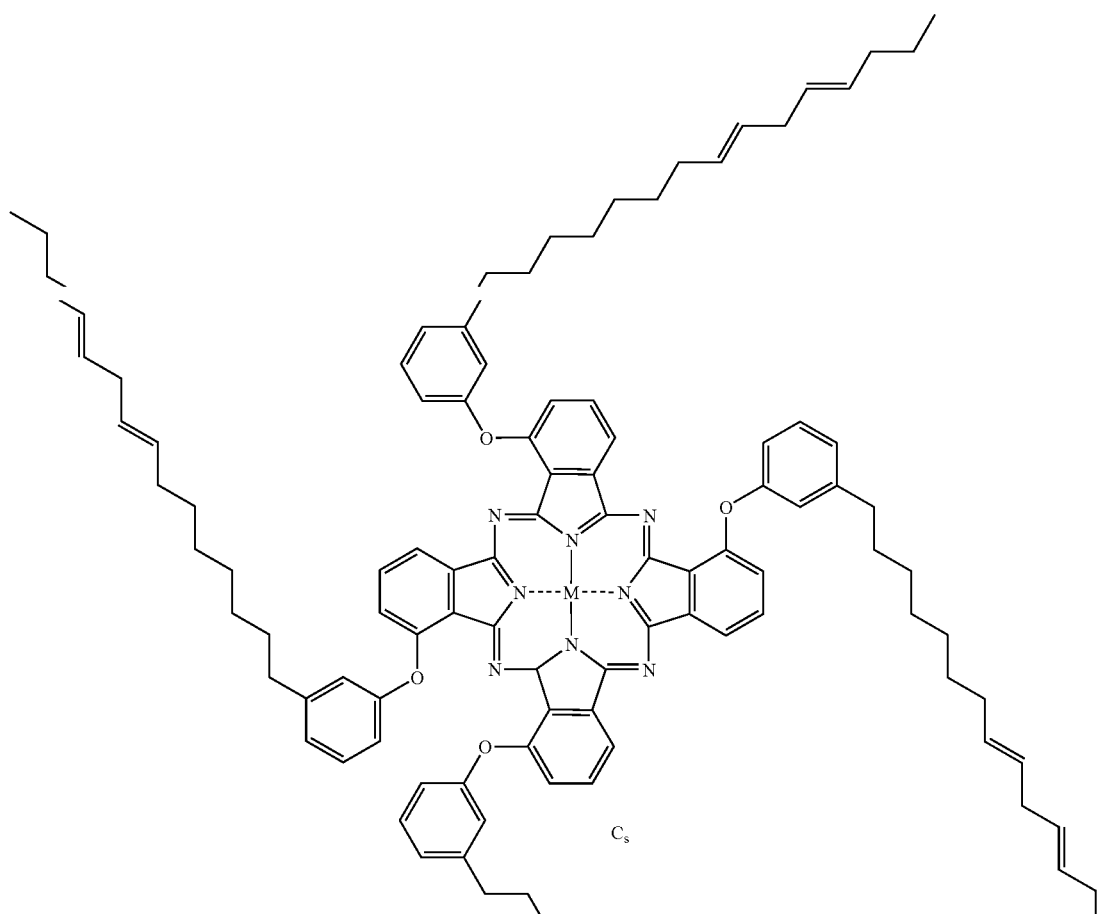
$C_s$

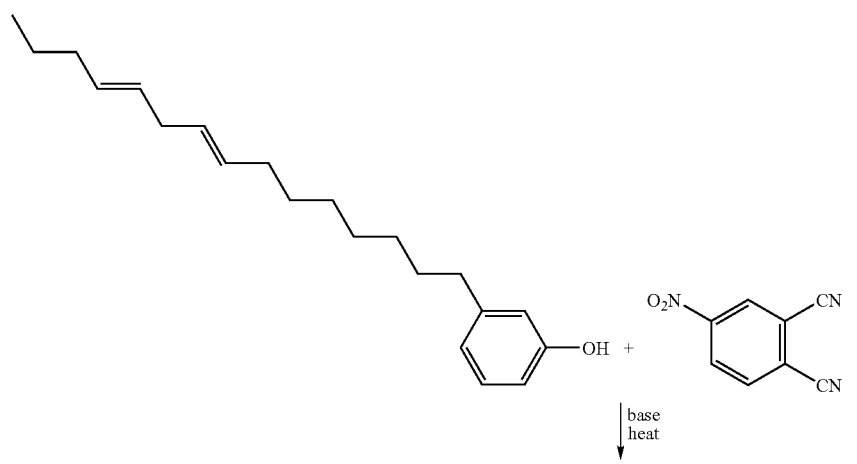
The colorant molecules disclosed herein can be prepared by any desired or effective process. In one embodiment, the process is carried out in two steps, the first of which is the synthesis of the alkylarylether adduct of phthalonitrile:
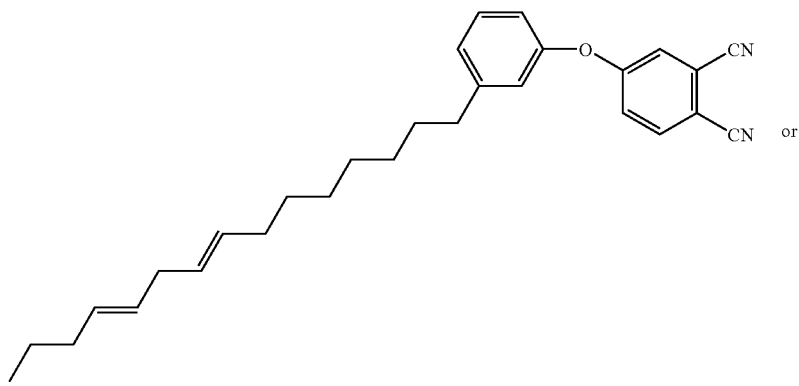

-continued

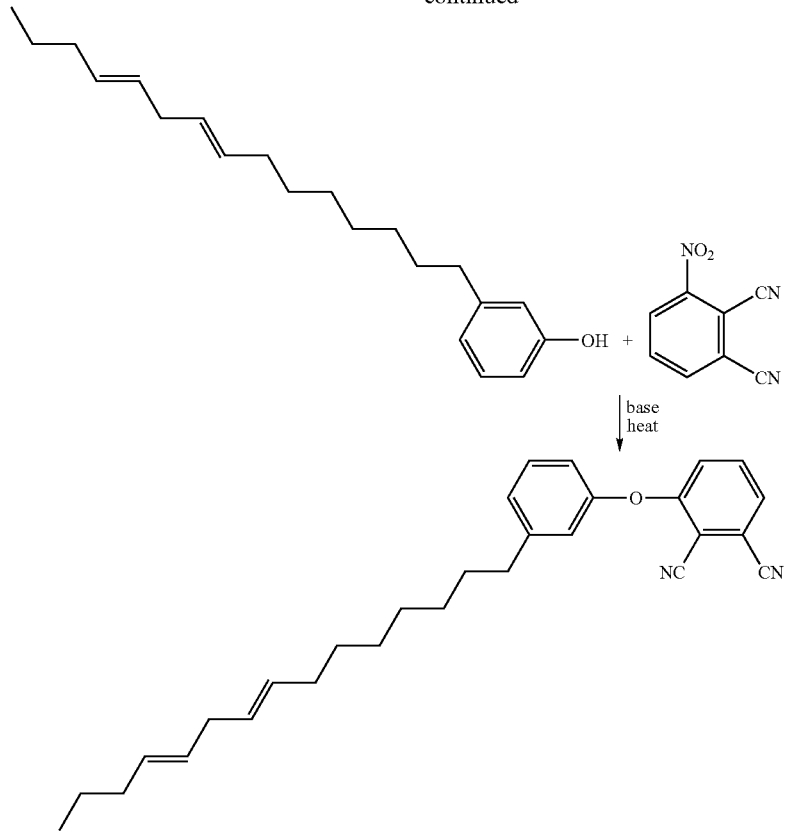

This process can be carried out by reacting the desired phenol with 3- or 4-nitrophthalonitrile in the presence of a base. Examples of suitable phenols include CARDOLITE® (MW=83.1; commercially available from Cardolite Corporation, Newark, N.J.) and the like.

Suitable bases include both organic and inorganic bases. Examples of organic bases include (but are not limited to) trialkyl amines (including triethylamine, tripropylamine, tributylamine, and the like), piperidine, 1,4-diazabicyclo (2.2.2)octane, and the like, as well as mixtures thereof. Examples of inorganic bases include (but are not limited to) lithium hydroxide, sodium hydroxide, potassium hydroxide, lithium carbonate, sodium carbonate, potassium carbonate, lithium hydride, sodium hydride, potassium hydride, lithium alkoxide, sodium alkoxide, potassium alkoxide (wherein the alkoxide can be, but is not limited to, methoxide, ethoxide, propoxide, butoxide (including t-butoxide), and the like), and the like, as well as mixtures thereof.

The reactants are dissolved in any solvent capable of dissolving the reactants, such as methanol, ethanol, propanol, butanol, dioxane, acetone, toluene, nitrobenzene, dimethyl formamide, dimethyl sulfoxide, 1-methyl-2-pyrrolidinone, 1-cyclohexyl-2-pyrrolidinone, sulfolane, and the like, as well as mixtures thereof. The solids content of the reaction mixture in one embodiment is at least about 0.5 parts by weight solvent per every 1 part by weight phenol, and in another embodiment is at least about 2 parts by weight solvent per every 1 part by weight phenol, and in one embodiment is no more than about 20 parts by weight solvent per every 1 part by weight phenol, and in another embodiment is no more than about 6 parts by weight solvent per every 1 part by weight phenol, although the solids content can be outside of these ranges.

In one embodiment, the phenol and the base are added to the solvent, followed by heating the reaction mixture, in one embodiment to a temperature of at least about 30° C., and in another embodiment to a temperature of at least about 80° C., and in one embodiment to a temperature of no more than about 150° C., and in another embodiment to a temperature of no more than about 120° C., although the temperature can be outside of these ranges, for a period of time in one embodiment of at least about 0.25 hour, and in another embodiment of at least about 0.5 hour, and in one embodiment of no more than about 8 hours, and in another embodiment of no more than about 2 hours, although the time can be outside of these ranges. By allowing the phenol and the base to react first, the phenoxide salt is formed; optionally, the 3- or 4-nitrophthalonitrile can be added with the phenol and the base in a single step, in which case the preheating step is eliminated.

Thereafter, the 3- or 4-nitrophthalonitrile is added to the reaction mixture and the reaction mixture is then heated, in one embodiment to a temperature of at least about 30° C., and in another embodiment to a temperature of at least about 70° C., and in one embodiment to a temperature of no more than about 150° C., and in another embodiment to a temperature of no more than about 110° C., although the temperature can be outside of these ranges, for a period of time in one embodiment of at least about 0.25 hour, and in another embodiment of at least about 0.5 hour, and in one embodiment of no more than about 24 hours, and in another embodiment of no more than about 4 hours, although the time can be outside of these ranges.

Thereafter, the reaction mixture is cooled, in one embodiment to a temperature of at least about 20° C., and in one embodiment to a temperature of no more than about 100° C., and in another embodiment to a temperature of no more than about 60° C., although the temperature can be outside of these ranges, followed by quenching in a precipitant solvent, such as water, methanol, mixtures thereof, and the like, by stirring the reaction solution into the precipitant solvent or vice-versa, in an amount in one embodiment of at least about 0.25 part by weight precipitant solvent per every 1 part by weight reaction solution, and in another embodiment of at least about 0.5 part by weight precipitant solvent per every 1 part by weight reaction solution, and in one embodiment of no more than about 2 parts by weight precipitant solvent per every 1 part by weight reaction solution, and in another embodiment of no more than about 10 parts by weight precipitant solvent per every 1 part by weight reaction solution, although the relative amounts can be outside of these ranges, thereby causing precipitation of the alkylaryloxyphthalonitrile intermediate product, which can be isolated by filtration. Thereafter, the intermediate can be reslurried with water or dilute acid (for example, 2 percent wt/volume hydrochloric acid) or base (for example, 2 percent sodium hydroxide) and filtered, and then reslurried and filtered with pure water, and the process repeated until inorganic and/or organic salts are removed from the product and the filtrate is of neutral pH and has a conductivity of less than about 20 microSiemens.

If desired, the product can be further purified by slurrying it in a solvent, such as methanol, ethanol, propanol, isopropanol, acetone, N,N'-dimethylformamide, mixtures thereof, mixtures of one or more of these solvents with water, and the like, followed by isolation of the product by filtration, which process may remove minor organic contaminants from the alkylaryloxyphthalonitrile intermediate. Thereafter, the solid product can, if desired, be dried by heating under vacuum at a temperature in one embodiment of at least about 20° C., and in another embodiment of at least about 25° C., and in one embodiment of no more than about 100° C., and in another embodiment of no more than about 50° C., although the temperature can be outside of these ranges, for a period in one embodiment of at least about 1 hour, and in one embodiment of no more than about 72 hours, although the time can be outside of these ranges. Optionally, if desired, the product can be recrystallized by heating in a solvent, such as methanol, ethanol, isopropanol, and the like, cooling to about 0° C., and filtering and drying the crystals.

For the synthesis of the alkylarylether adduct of phthalonitrile, the molar ratio of phenol to 3- or 4-nitrophthalonitrile in one embodiment is at least about 1:1, and in one embodiment is no more than about 3:1, and in another embodiment is no more than about 1.5:1, although the molar ratio can be outside of these ranges, and the molar ratio of phenol to base in one embodiment is at least about 1:1, and in one embodiment is no more than about 3:1, and in another embodiment is no more than about 1:1 to about 1.5:1, although the molar ratio can be outside of these ranges.

In this embodiment, the second step in the synthesis of the colorant molecules entails conversion of the alkylarylether phthalonitrile adduct to the phthalocyanine:

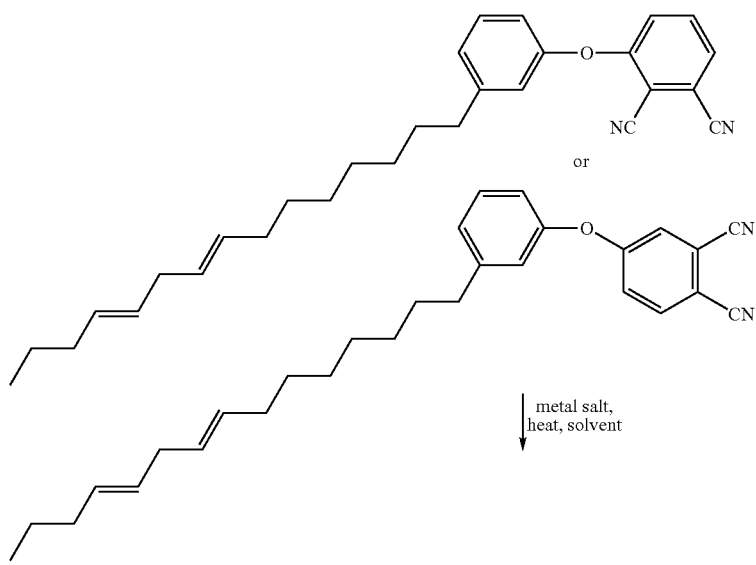

-continued

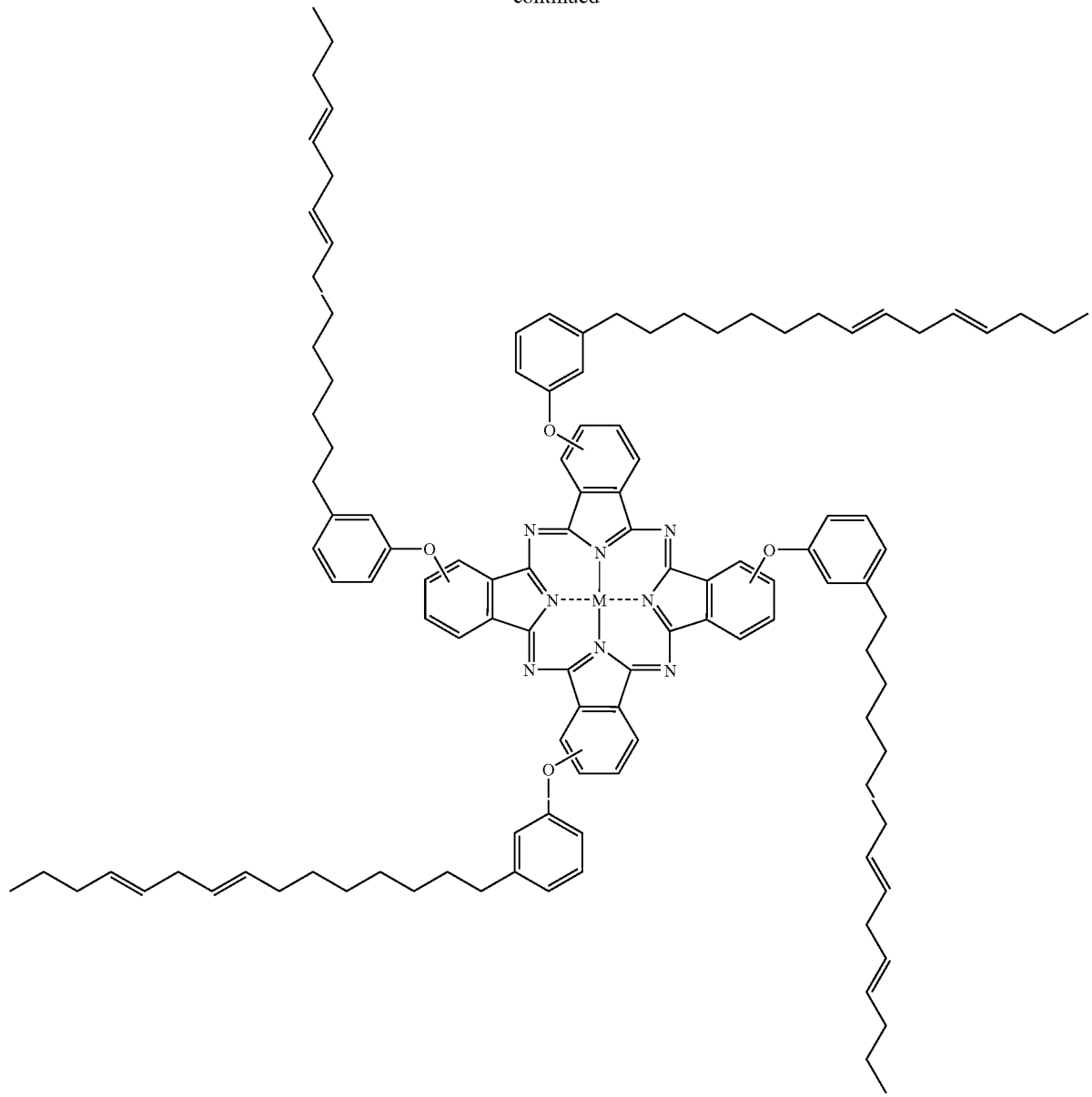

This process can be carried out by reacting the alkylarylether phthalonitrile adduct with a metal compound. Examples of suitable metal compounds include anhydrous and hydrated salts or complexes of the formula $$MX_n \cdot yH_2O$$

wherein M is a metal, such as lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, lead, and the like, X is an anion, such as a carboxylate-containing moiety, such as formate, acetate, acetoacetate, propionate, butyrate, benzoate, and the like, an alkoxide, such as methoxide, ethoxide, isopropoxide, or the like, acetyl acetonate, a halide atom, such as fluoride, chloride, bromide, or iodide, sulfate, alkyl sulfonate, aryl sulfonate, nitrate, nitrite, phosphate, and the like, n is a number representing the valence of the metal, and y is an integer of from 0 to 10. Specific examples include (but are not limited to) anhydrous copper chloride, hydrated copper chloride, anhydrous copper acetate, hydrated copper acetate, anhydrous copper sulfate, hydrated copper sulfate, anhydrous copper nitrate, hydrated copper nitrate, anhydrous copper bromide, hydrated copper bromide, and the like, as well as mixtures thereof.

The alkylarylether phthalonitrile adduct, metal compound, and a solvent, such as ethylene glycol, amyl alcohol, hexanol, heptanol, tetralin, decalin, ISOPAR® (refined mineral spirits solvents available from Exxon), xylene, tributyl amine, N,N-dimethylaniline, quinoline, 1-chloronaphthalene, trialkanolamines, monoalkyl dialkanolamines, dialkyl monoalkanolamines (such as 2-dimethylaminoethanol, 2-diethylaminoethanol, 2-dimethylamino-1-propanol, and the like), dimethylsulfoxide, N,N-dimethylformamide, N,N-dimethylacetamide, 1-methyl-2-pyrrolidinone, N-cyclohexyl-2-pyrrolidinone, sulfolane, and the like, as well as mixtures thereof, are combined to form the reaction mixture. The solids content of the reaction mixture in one embodiment is at least about 3 parts by weight alkylarylether phthalonitrile adduct per every 100 parts by weight solvent, and in another embodiment is at least about 10 parts by weight alkylarylether phthalonitrile adduct per every 100 parts by weight solvent, and in one embodiment is no more than about 60 parts by weight alkylarylether phthalonitrile adduct per every 100 parts by weight solvent, and in another embodiment is no more than about 30 parts by weight alkylarylether phthalonitrile adduct per every 100 parts by weight solvent, although the solids content can be outside of these ranges.

The reaction mixture is heated to reflux. Reflux temperature in one embodiment is at least about 80° C., and in another embodiment is at least about 140° C., and in one embodiment is no more than about 250° C., and in another embodiment is no more than about 190° C., although the temperature can be outside of these ranges.

The reaction mixture is refluxed for a period of time in one embodiment of at least about 1 hour, and in another embodiment of at least about 2 hours, and in one embodiment of no more than about 24 hours, and in another embodiment of no more than about 8 hours, although the time can be outside of these ranges.

Thereafter, the reaction is cooled to a temperature in one embodiment of at least about 25° C., and in another embodiment of at least about 50° C., and in one embodiment of no more than about 150° C., and in another embodiment of no more than about 100° C., although the temperature can be outside of these ranges, filtered, typically through a filter of paper, glass fiber, polypropylene, GORETEX®, and the like, although other methods of filtration can also be used, and washed with a solvent, such as water, acetone, methyl ethyl ketone, methyl isobutyl ketone, methanol, ethanol, propanol, butanol, acetone, dimethyl formamide, dimethyl sulfoxide, N-methylpyrrolidinone, sulfolane, and the like, as well as mixtures thereof. If desired, the precipitated blue solids can then again be filtered, slurried with a solvent, such as acetone, methyl ethyl ketone, methyl isobutyl ketone, methanol, ethanol, propanol, butanol, acetone, dimethyl formamide, dimethyl sulfoxide, N-methylpyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, a catalyst or reaction promoter can also be included in the reaction mixture. Examples of suitable catalysts or reaction promoters include trialkanolamines, dialkyl monoalkanolamines, monoalkyl dialkanolamines, and the like, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples of suitable catalysts or reaction promoters including (but not limited to) 2-diethylaminoethanol, 2-dimethylaminoethanol, 2-dimethylamino-1-propanol, and the like, as well as mixtures thereof.

Suitable catalysts or reaction promoters also include ammonia-releasing compounds. Suitable ammonia-releasing compounds are any ammonium salts that release ammonia when heated, including (but not limited to) ammonium carbonate, ammonium carbamate, ammonium bicarbonate, ammonium molybdate, urea, ammonium salts of mono- and dicarboxylic acids, including (but not limited to) formic acid, acetic acid, propionic acid, butyric acid, benzoic acid, oxalic acid, malonic acid, and the like, as well as mixtures thereof. When an ammonia releasing compound is employed as a catalyst or reaction promoter, while not required, in a specific embodiment, the reaction of the alkylarylether phthalonitrile adduct with the copper salt takes place with a two stage temperature-warming profile. The first stage entails heating the reaction mixture to an intermediate temperature, in one embodiment of at least about 80° C., and in one embodiment of no more than about 140° C., although the temperature can be outside of these ranges, and for a period of from time in one embodiment of at least about 0.25 hour, and in one embodiment of no more than about 3 hours, although the time can be outside of these ranges, during which time ammonia gas is slowly released. Thereafter, the reaction mixture is heated to a final temperature, in one embodiment of at least about 120° C., and in another embodiment of at least about 140° C., and in one embodiment of no more than about 250° C., and in another embodiment of no more than about 190° C., although the temperature can be outside of these ranges, and for a period of time in one embodiment of at least about 1 hour, and in another embodiment of at least about 2 hours, and in one embodiment of no more than about 24 hours, and in another embodiment of no more than about 10 hours, although the time can be outside of these ranges.

For the synthesis of the phthalocyanine compound, the molar ratio of phenoxy phthalonitrile adduct to metal compound in one embodiment is at least about 2:1, and in another embodiment is at least about 3:1, and in one embodiment is no more than about 10:1, and in another embodiment is no more than about 6:1, although the molar ratio can be outside of these ranges. When a catalyst or reaction promoter is used, the molar ratio of catalyst or reaction promoter to metal compound in one embodiment is at least about 0.1:1, and in another embodiment is at least about 0.5:1, and in one embodiment is no more than about 10:1, and in another embodiment is no more than about 2:1, although the molar ratio can be outside of these ranges.

In one specific embodiment, two or more catalysts or reaction promoters can be used, such as one or more from the class of alkanolamines and one or more from the class of ammonia-releasing compounds, two or more from the class of alkanolamines, two or more from the class of ammonia-releasing compounds, or the like.

Metal-free phthalocyanine can be prepared by treatment of an alkali metal phthalocyanine such as dilithium, disodium, dipotassium, beryllium, magnesium, or calcium phthalocyanine, prepared according to the above process, with a dilute aqueous or alcoholic acid. Examples of suitable acids include (but are not limited to) hydrochloric acid, phosphoric acid, sulfuric acid, nitric acid, sulfonic acids, such as alkylsulfonic, arylsulfonic, arylalkylsulfonic, and alkylarylsulfonic, wherein the alkyl portions thereof can be linear or branched, in one embodiment with from 1 to about 18 carbon atoms, although the number of carbon atoms can be outside of this range, and wherein the aryl portions thereof in one embodiment have from 6 to about 12 carbon atoms, although the number of carbon atoms can be outside of this range, carboxylic acids, such as alkylcarboxylic, arylcarboxylic, arylalkylcarboxylic, and alkylarylcarboxylic, wherein the alkyl portions thereof can be linear or branched, and wherein the carboxylic acid in one embodiment has from 1 to about 24 carbon atoms, although the number of carbon atoms can be outside of this range (such as formic, acetic, propionic, benzoic, and the like), and the like, as well as mixtures thereof. The acid is present in the water or alcohol solution in any desired or effective concentration, in one embodiment of at least about 1 percent by weight acid, and in another embodiment of at least about 2 percent by weight acid, and in one embodiment of no more than about 10 percent by weight acid, and in another embodiment of no more than about 5 percent by weight acid, although the acid concentration can be outside of these ranges. Examples of suitable alcohols include (but are not limited to) methanol, ethanol, propanol, isopropanol, ethylene glycol, and the like, as well as mixtures thereof.

Alternatively, the metal-free phthalocyanine dye can be prepared by heating a concentrated solution of phenoxyphthalonitrile in a dialkyl monoalkanolamine solvent, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples including 2-dimethylaminoethanol, 2-diethylaminoethanol, 2-dimethylamino-1-propanol, and the like, as well as mixtures thereof, in the presence of an ammonia-releasing compound.

The ratio by weight of phenoxyphthalonitrile to dialkyl monoalkanolamine solvent in one embodiment is at least about 10:80, and in another embodiment is at least about 25:75, and in one embodiment is no more than about 60:40, and in another embodiment is no more than about 50:50, although the relative amounts can be outside of these ranges.

Suitable ammonia-releasing compounds include those listed hereinabove with respect to catalysts or reaction promoters. The molar ratio of ammonia-releasing compound to phenoxyphthalonitrile in one embodiment is at least about 0.1 molar equivalent ammonia-releasing compound per every 1 molar equivalent of phenoxyphthalonitrile, and in another embodiment is at least about 0.5 molar equivalent ammonia-releasing compound per every 1 molar equivalent of phenoxyphthalonitrile, and in one embodiment is no more than about 5 molar equivalents ammonia-releasing compound per every 1 molar equivalent of phenoxyphthalonitrile, and in another embodiment is no more than about 2 molar equivalents ammonia-releasing compound per every 1 molar equivalent of phenoxyphthalonitrile, although the relative amounts can be outside of these ranges.

The mixture can be initially heated to a first temperature, in one embodiment of at least about 50° C., and in another embodiment of at least about 65° C., and in one embodiment of no more than about 130° C., and in another embodiment of no more than about 125° C., although the temperature can be outside of these ranges, for a period of time in one embodiment of at least about 10 minutes, and in another embodiment of at least about 20 minutes, and in one embodiment of no more than about 120 minutes, and in another embodiment of no more than about 60 minutes, although the time can be outside of these ranges, to promote slow release of ammonia, then is subsequently heated to a second temperature which is higher than the first temperature, in one embodiment of at least about 120° C., and in another embodiment of at least about 135° C., and in one embodiment of no more than about 200° C., and in another embodiment of no more than about 170° C., although the temperature can be outside of these ranges, for a period of time in one embodiment of at least about 1 hour, and in another embodiment of at least about 2 hours, and in one embodiment of no more than about 24 hours, and in another embodiment of no more than about 10 hours, although the time can be outside of these ranges.

Thereafter, the reaction mixture is cooled, in one embodiment to a temperature of at least about 25° C., and in another embodiment to a temperature of at least about 50° C., and in one embodiment to a temperature of no more than about 125° C., and in another embodiment to a temperature of no more than about 100° C., although the temperature can be outside of these ranges, and the product is separated by filtration or by decantation and washed with a solvent, such as water, acetone, methyl ethyl ketone, methyl isobutyl ketone, methanol, ethanol, propanol, butanol, acetone, dimethyl formamide, dimethyl sulfoxide, N-methylpyrrolidinone, sulfolane, and the like, as well as mixtures thereof. If desired, the precipitated blue solids can then again be filtered, slurried with a solvent, such as acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof, in relative amounts in one embodiment of at least about 3 parts by weight solvent per every 1 part by weight product, and in one embodiment of no more than about 100 parts by weight solvent per every 1 part by weight product, although the relative amounts can be outside of these ranges, for a period of time in one embodiment of at least about 0.5 hour, and in one embodiment of no more than about 24 hours, although the time can be outside of these ranges, and at a temperature in one embodiment of at least about 25° C., and in another embodiment of at least about 50° C., and in one embodiment of no more than about 200° C., and in another embodiment of no more than about 100° C., although the temperature can be outside of these ranges. The product is then filtered again and dried.

If desired, the alkylarylether phthalonitrile adduct need not be isolated by addition of precipitant subsequent to its synthesis and prior to its reaction with the metal compound. In this embodiment, the reaction mixture in which the alkylarylether phthalonitrile adduct was formed can, if desired, optionally be filtered to remove any inorganic salts, followed by addition to the reaction mixture of the metal compound and, optionally, any desired reaction promoter. Thereafter, the reaction mixture is heated, to a temperature in one embodiment of at least about 120° C., and in another embodiment of at least about 140° C., and in one embodiment of no more than about 250° C., and in another embodiment of no more than about 190° C., although the temperature can be outside of these ranges, for a period of time in one embodiment of at least about 1 hour, and in another embodiment of at least about 2 hours, and in one embodiment for a period of time of no more than about 24 hours, and in another embodiment of no more than about 8 hours, although the time can be outside of these ranges. The phthalocyanine product thus formed can then be isolated as described hereinabove with respect to the two-step process.

Phase change inks as disclosed herein contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, triamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. Also suitable are branched triamides as disclosed in U.S. Pat. No. 6,860,930, the disclosure of which is totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., Fischer-Tropsch waxes, available from Sasol Wax Americas, Inc., Shelton, Conn., waxes as disclosed in, for example, Copending application Ser. No. 11/126,745 and U.S. Patent Publication 2005/0130054, the disclosures of which are totally incorporated herein by reference, and waxes as disclosed in Copending application Ser. Nos. 11/290,221, 11/291,055, 11/290,263, 11/290,222, and 11/290,265, filed Nov. 30, 2005, the disclosures of each of which are totally incorporated herein by reference.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 80 percent by weight of the ink, in another embodiment of no more than about 70 percent by weight of the ink, and in yet another embodiment of no more than about 60 percent by weight of the ink, although the amount can be outside of these ranges; (b) a stearyl stearamide wax, present in the ink in an amount in one embodiment of at least about 3 percent by weight of the ink, in another embodiment of at least about 5 percent by weight of the ink, and in yet another embodiment of at least about 8 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 5 percent by weight of the ink, in another embodiment of at least about 8 percent by weight of the ink, and in yet another embodiment of at least about 10 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

In another specific embodiment, the phase change ink carrier comprises (a) a polyethylene wax, (b) a stearyl stearamide wax, (c) a branched triamide of the formula

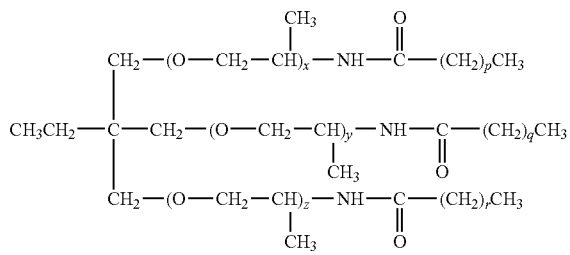

wherein x, y, and z each independently represent the number of propyleneoxy repeat units and x+y+z is from about 5 to about 6, and wherein p, q, and r each, independently of the others, are integers representing the number of repeat —($CH_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

The ink need can be, but need not be, a phase change curable ink. Other embodiments encompassed herein include radiation curable inks that are liquid at room temperature. Examples of additional suitable ink carrier materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks contain a colorant compound of the formula 0.1 percent by weight of the ink, in another embodiment of at least about 1 percent by weight of the ink, in yet another embodiment of at least about 2 percent by weight of the ink, in still another embodiment of at least about 3 percent by weight of the ink, and in another embodiment of at least about 5 percent by weight of the ink, and in one embodiment of no more than about 20 percent by weight of the ink, in another embodiment of no more than about 13 percent by weight of the ink, and in yet another embodiment of no more than about 8 percent by weight of the ink, although the amount can be outside of these ranges. The colorant as disclosed herein can

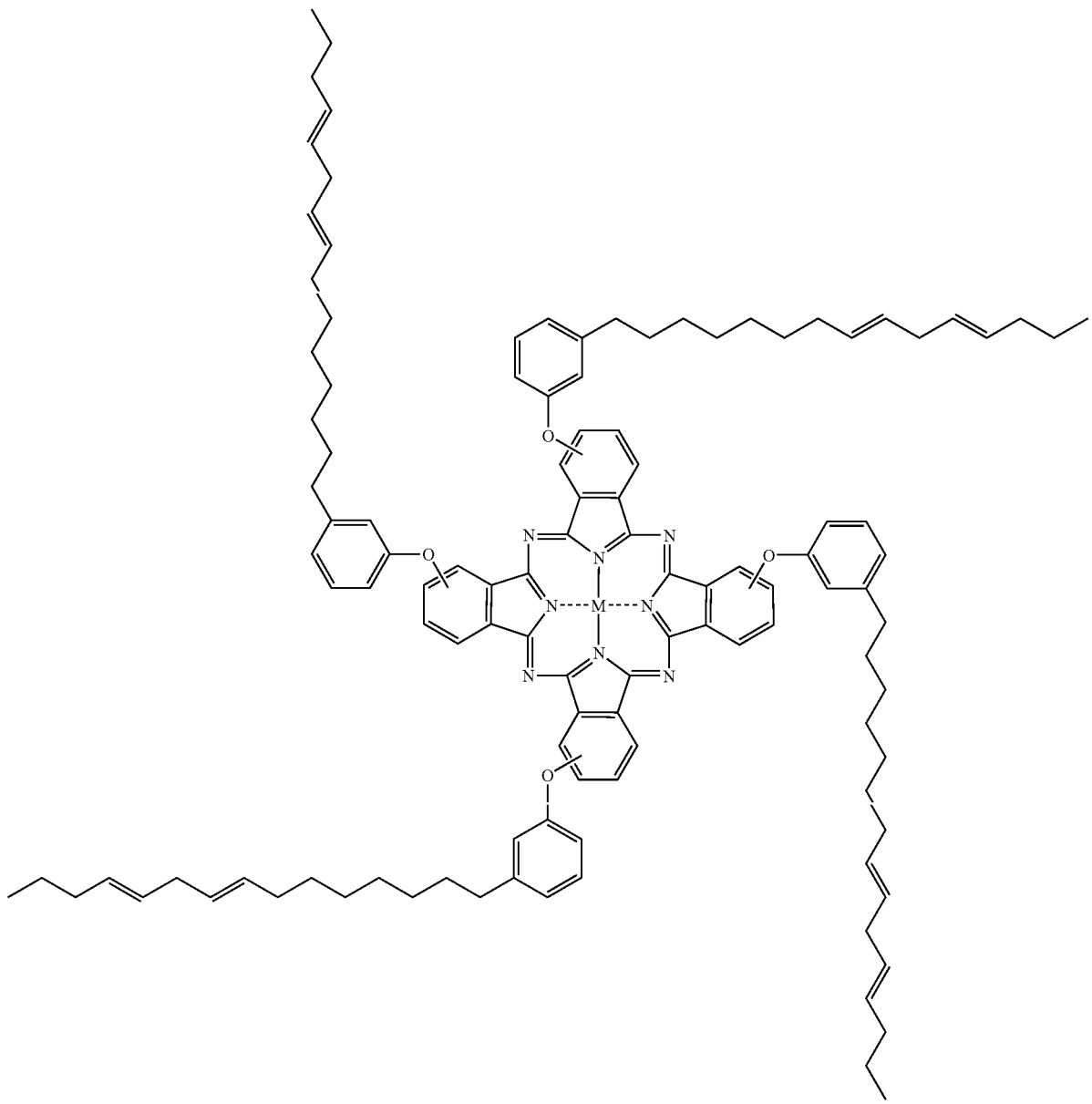

wherein M is an atom or group of atoms capable of bonding to the central cavity of a phthalocyanine molecule, wherein axial ligands optionally can be attached to M. This colorant is present in the ink in any desired or effective amount to obtain the desired color or hue, in one embodiment of at least about either be the sole colorant in the ink or can be present in combination with other colorants.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

When the ink contains curable monomers, the ink can further contain an optional initiator. Examples of suitable initiators include (but are not limited to) benzophenones, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE and DAROCUR from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-(methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenyl-phosphine oxide (available as Ciba IRGACURE 819) and other acyl phosphines, 2-methyl-1-(4-(methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959), 2-benzyl 2-dimethylamino 1-(4-morpholinophenyl) butanone-1 (available as Ciba IRGACURE 369), 2-hydroxy-1-(4-(4-(2-hydroxy-2-methylpropionyl)-benzyl)-phenyl)-2-methylpropan-1-one (available as Ciba IRGACURE 127), 2-dimethylamino-2-(4-methylbenzyl)-1-(4-morpholin-4-ylphenyl)-butanone (available as Ciba IRGACURE 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethyl ketal, and the like, as well as mixtures thereof.

Optionally, the inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the ink, and in another embodiment at least about 1 percent by weight of the ink, and in one embodiment no more than about 15 percent by weight of the ink, and in another embodiment no more than about 10 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

Example I 4-(3-Unsaturated C-15-Phenoxy)Phthalonitrile Intermediate

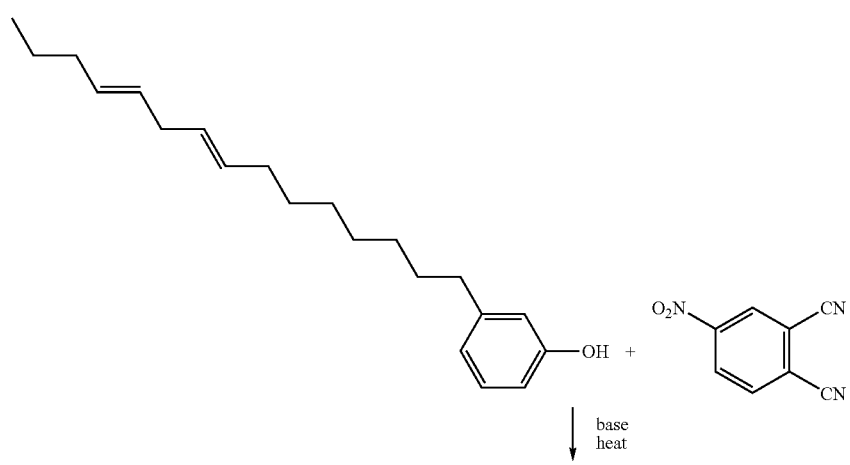

-continued

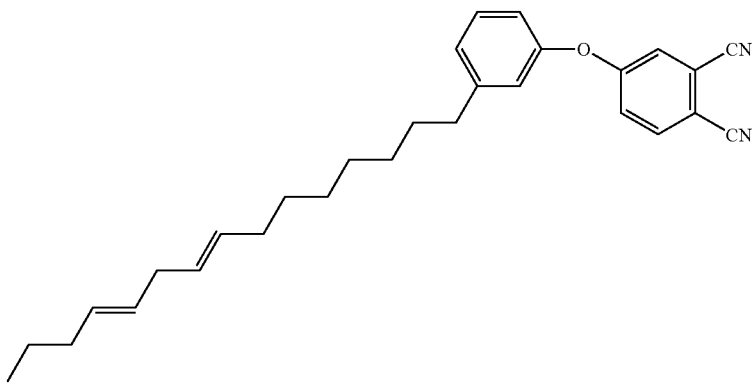

To a 500 milliliter 3-necked round bottom flask equipped with a magnetic stir bar, a nitrogen inlet, a silicone oil bath, and a condenser was charged 83.1 grams of CARDOLITE® (MW=83.1; obtained from Cardolite Corporation, Newark, N.J.), 33.5 grams of potassium carbonate (MW=138), and 330 grams of dry DMSO (in molecular sieves). The round bottom flask was placed in a 90° C. oil bath. After stirring for about half an hour, 41.9 grams of 4-nitrophthalonitrile (MW=173; obtained from TCI America, Portland, Oreg.) was added. The contents were heated/stirred for about 3 additional hours, followed by pouring into 300 grams of deionized water. A thick brown oil precipitated out. About 300 milliliters of hexanes were then added to the oil to extract the product and the contents were transferred to a separatory funnel. The lower (water/DMSO) layer was drained and the top (hexanes) layer was again washed with water. The water and the emulsion layer were drained. Since methanol and hexanes are not miscible, methanol was added to the hexanes layer to extract the starting material. However, no separation occurred. Hence, water was added to the separatory funnel to force separation. The water/methanol layer was then drained and the top hexanes layer was evaporated. A normal phase TLC was run employing toluene as the mobile phase, showing that no starting materials remained. The product was then redissolved in hexanes and run through a silica plug. The hexanes were subsequently stripped off, yielding the desired product.

Example II 4-(3-Unsaturated C-15-Phenoxy)Phthalonitrile Intermediate

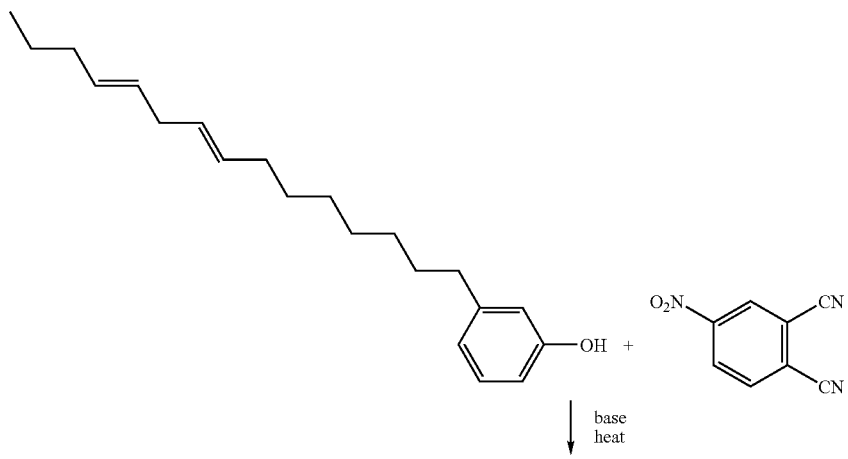

-continued

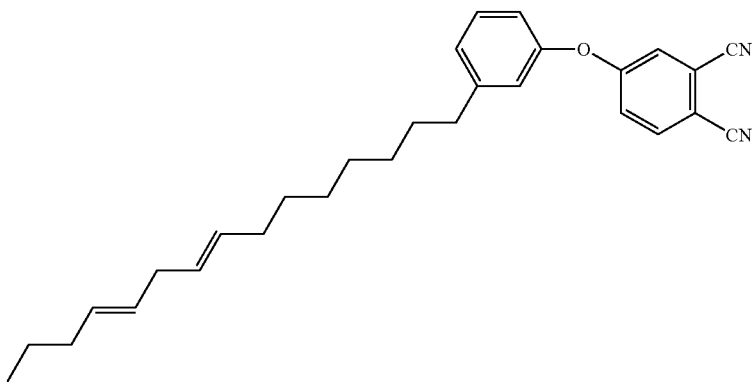

To a 500 milliliter 3-necked round bottom flask equipped with a magnetic stir bar, a nitrogen inlet, a silicone oil bath, and a condenser was charged 83.1 grams of CARDOLITE® (MW=83.1), 33.5 grams of potassium carbonate (MW=138), and 270 grams of dry DMSO. The round bottom flask was placed in a 90° C. oil bath. After stirring for about half an hour, 41.9 grams of 4-nitrophthalonitrile (MW=173) was added. The contents were heated/stirred for about 4 additional hours, followed by pouring into 600 grams of deionized water. A thick brown oil precipitated out. The contents were transferred to a separatory funnel. The low water/DMSO layer was drained and the top oil layer was dissolved in 300 milliliters of hexanes. The hexane layer was then washed with water twice and collected in a jar. Hexanes were evaporated and the remaining product was stored in a dark cabinet.

Example III 3-(3-Unsaturated C-15-Phenoxy)Phthalonitrile Intermediate

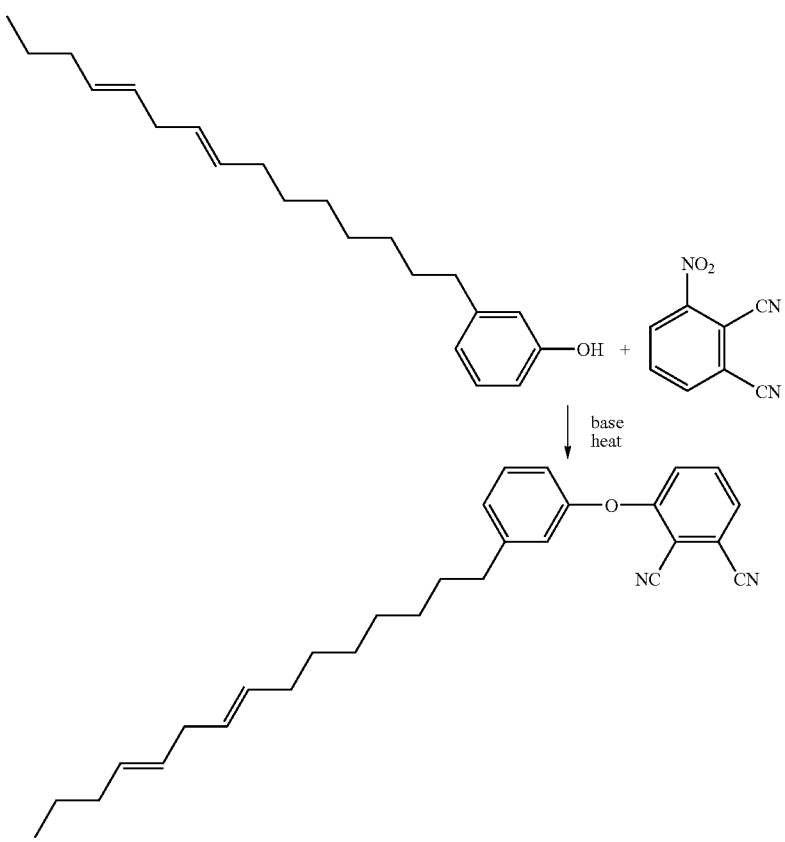

To a 500 milliliter 3-necked round bottom flask equipped with a magnetic stir bar, a nitrogen inlet, a silicone oil bath, and a condenser is charged 83.1 grams of CARDOLITE® (MW=83.1), 33.5 grams of potassium carbonate (MW=138), and 270 grams of dry DMSO. The round bottom flask is placed in a 90° C. oil bath. After stirring for about half an hour, 41.9 grams of 3-nitrophthalonitrile (MW=173) is added. The contents are heated/stirred for about 4 additional hours, followed by pouring into 600 grams of deionized water. It is believed that a product will precipitate out. The contents are transferred to a separatory funnel. The low water/DMSO layer is drained and the top oil layer is dissolved in 300 milliliters of hexanes. The hexane layer is then washed with water twice and collected in a jar. Hexanes are evaporated and the remaining product is stored in a dark cabinet.

Example IV (Unsaturated C-15-Phenoxy)-Substituted Copper Phthalocyanine

To a 100 milliliter one-necked round bottom flask equipped with a magnetic stir bar, a silicone oil bath, and a condenser was charged 10.0 grams of the intermediate prepared in Example I (MW=430), 1.2 grams of copper acetate (MW=181; obtained from Aldrich Chemical Co., Milwaukee, Wis.), 3.6 grams of ammonia acetate (MW=77; obtained from Aldrich Chemical Co.), and 40 milliliters of dry N-methylpyrrolidinone (NMP). The round bottom flask was placed in a 120° C. oil bath with stirring. A blue color developed within 30 minutes. The temperature was then raised to 180° C. and 20 milliliters of additional dry NMP was added. After stirring at 180° C. for 1 hour, the contents were cooled. Very few solids precipitated out at this point, so the contents were poured into 250 milliliters of deionized water. A tacky blue solid precipitated out. The solids were collected by filtration, dried, put in a bottle, and placed in a dark cabinet.

Example V (Unsaturated C-15-Phenoxy)-Substituted Copper Phthalocyanine

To a 100 milliliter one-neck round bottom flask equipped with a magnetic stir bar, a silicone oil bath, and a condenser was charged 10.0 grams of the intermediate prepared in Example I (MW=430), 3.6 grams of ammonia acetate (MW=77), and 40 milliliters of dry NMP. The round bottom flask was placed in a 120° C. oil bath with stirring. A blue color developed within 30 minutes. The temperature was then raised to 180° C. and 20 milliliters of additional dry NMP was added. After stirring at 180° C. for 1 hour, the contents were cooled. Very few solids precipitated out at this point, so the contents were poured into 250 milliliters of deionized water. A tacky blue solid precipitated out. The solids were collected by filtration, dried, put in a bottle and placed in a dark cabinet.

Example VI (Unsaturated C-15-Phenoxy)-Substituted Copper Phthalocyanine

To a 100 milliliter one-necked round bottom flask equipped with a magnetic stir bar, a silicone oil bath, and a condenser was charged 10.0 grams of the intermediate prepared in Example II (MW=430), 1.2 grams of copper acetate (MW=181), 3.6 grams of ammonia acetate (MW=77), and 40 milliliters of dry NMP. The round bottom flask was placed in a 120° C. oil bath with stirring. A blue color developed within 30 minutes. The temperature was then raised to 180° C. and 20 milliliters of additional dry NMP was added. After stirring at 180° C. for 1 hour the contents were cooled. Very few solids precipitated out at this point, so the contents were poured into 250 milliliters of deionized water. A tacky blue solid precipitated out. Toluene was added to the mixture to extract the product. The crude reaction mixture dissolved in toluene was poured in a separate funnel and washed with deionized water. The lower water/NMP layer was drained and the top toluene layer was run through a silica plug. After the toluene was removed, the spectral strength of the product was measured in toluene: e=28.29 L×A/g @ 681 nm. The solids were put in a bottle and placed in a dark cabinet.

Example VII (Unsaturated C-15-Phenoxy)-Substituted Copper Phthalocyanine

To a 100 milliliter one-necked round bottom flask equipped with a magnetic stir bar, a silicone oil bath, and a condenser is charged 10.0 grams of the intermediate prepared in Example III (MW=430), 1.2 grams of copper acetate (MW=181), 3.6 grams of ammonia acetate (MW=77), and 40 milliliters of dry NMP. The round bottom flask is placed in a 120° C. oil bath with stirring. It is believed that a blue color will develop within 30 minutes. The temperature is then raised to 180° C. and 20 milliliters of additional dry NMP is added. After stirring at 180° C. for 1 hour the contents are cooled. The contents are poured into 250 milliliters of deionized water. Toluene is added to the mixture to extract the product. The crude reaction mixture dissolved in toluene is poured in a separate funnel and washed with deionized water. The lower water/NMP layer is drained and the top toluene layer is run through a silica plug. The solids are put in a bottle and placed in a dark cabinet.

Example VIII (Unsaturated C 15-Phenoxy)-Substituted Manganese Phthalocyanine

To a 100 milliliter one-neck round bottom flask equipped with a magnetic stir bar, a silicone oil bath, and a condenser is charged 4.73 grams of the intermediate prepared in Example II (MW=426), 0.34 grams of manganese II chloride (available from Aldrich Chemical Co.), 3.6 grams of DMAE (dimethylaminoethanol, available from Aldrich Chemical Co.), and 20 milliliters of dry NMP. The round bottom flask is placed in a 180° C. oil bath with stirring. It is believed that a bluish-green color will develop within 60 minutes. The reaction mixture is then stirred at 180° C. After about 1 hour at 180° C., 50 milliliters of dimethyl formamide (DMF) is added and the reaction mixture is then cooled to room temperature. About 100 milliliters of hexanes is then added to the crude reaction product and the resulting mixture is transferred to a separatory funnel. The lower DMF/NMP layer is drained and the top hexanes layer is collected. The hexanes are distilled off and the remaining product is collected, placed in a bottle, and stored in a dark cabinet.

Example IX (Unsaturated C 15-Phenoxy)-Substituted Iron Phthalocyanine

The process of Example VIII is repeated except that 0.38 grams of iron II chloride (available from Aldrich Chemical Co.) are substituted for the 0.34 grams of manganese II chloride.

Ink Example 1

An ink base was prepared by melting, admixing, and filtering the following ingredients: (a) polyethylene wax (PE 655, obtained from Baker Petrolite, Tulsa, Okla., of the formula $CH_3(CH_2)_{50}CH_3$), 43.59 parts by weight; (b) stearyl stearamide wax (KEMAMIDE® S-180, obtained from Crompton Corporation, Greenwich, Conn.), 19.08 parts by weight; (c) tetra-amide resin obtained from the reaction of one equivalent of a C-36 dimer acid (obtained from Uniqema, New Castle, Del.) with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 18.94 parts by weight; (d) urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 11.71 parts by weight; (e) urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 6.48 parts by weight; and (f) NAUGUARD® 445 antioxidant (obtained from Uniroyal Chemical Co., Middlebury, Conn.), 0.20 parts by weight.

600 grams of the ink carrier components listed above in the percentages listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER AID, obtained from Fluka Chemika, Switzerland, and proceeded at a temperature of 135° C. until complete after 6 hours. The ink base was poured into molds containing about 31 grams of the colorless ink base and allowed to cool.

Ink Example 2

About 30.0 grams of the colorless ink base from Ink Example 1 was placed in a 100 milliliter beaker with a magnetic stir bar and subsequently placed in a 135° C. oil bath until molten. Thereafter, 1.2 grams of the colorant from Example V was added and stirred for about 3 hours. The cyan colored ink was then poured into an aluminum mold.

Ink Example 3

Using a RK Print-Coat Instruments Ltd. K-proofer, print samples of the ink from Ink Example 2 were produced on HAMMERMILL LASERPRINT® paper. These proofs show three different intensities of ink coverage on the paper.

Ink Example 4

Ink Examples 1 through 3 are repeated with the unsaturated C 15-phenoxy)-substituted copper phthalocyanine prepared as described in Example VII. It is believed that similar results will be obtained.

Ink Example 5

Ink Examples 1 through 3 are repeated with the unsaturated C 15-phenoxy)-substituted manganese phthalocyanine prepared as described in Example VIII. It is believed that similar results will be obtained.

Ink Example 6

Ink Examples 1 through 3 are repeated with the unsaturated C 15-phenoxy)-substituted iron phthalocyanine prepared as described in Example IX. It is believed that similar results will be obtained.

Ink Example 7

To a 2 liter three neck flask equipped with a stopper, dropping funnel, stir bar, and reflux condenser is added trimethyl-1,6-diisocyanatohexane (mixture of 2,2,4- and 2,4,4-isomers, 118.7 grams, 0.57 mol, available from Sigma-Aldrich, Milwaukee, Wis.), dibutyltin dilaurate (3.56 grams, 5.6 mmol, available from Sigma-Aldrich) and anhydrous tetrahydrofuran (1 liter). 1,4-Butanediol vinyl ether (133.2 grams, 1.2 mol, available from Sigma-Aldrich) is added slowly dropwise to the stirring solution via the addition funnel. The reaction mixture is brought to reflux and is kept at this temperature until deemed complete by infrared spectroscopy (about 5 hours, confirmed by the disappearance of the isocyanate peak at $2200\ cm^{-1}$). When the reaction is complete, methanol (500 milliliters) is added to quench any residual isocyanate and the solution is stirred for 0.5 hour. The solvent is stripped in vacuo and the residual oil is triturated with hexane (3×500 milliliters), dissolved in methylene chloride (1 liter), washed with water (1×750 milliliters), dried over anhydrous magnesium sulfate, filtered, and concentrated in vacuo to afford a pale yellow oil. The product is believed to be bis(4-(vinyloxy)butyl) trimethyl-1,6-hexanediylbiscarbamate (mixture of 2,2,4- and 2,4,4-isomers, a mixture of compounds of the formulae

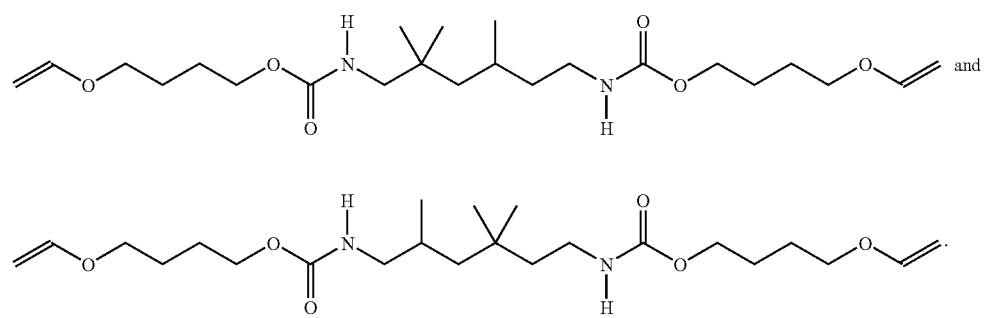

To a 1 liter, two neck flask equipped with a stir bar, argon inlet, and stopper is added dodecanedioic acid (10.0 grams, 43 mmol, available from Sigma-Aldrich), 1,4-butanediol vinyl ether (10.1 grams, 87 mmol, available from Sigma-Aldrich), 4-(dimethylamino)pyridine (1.07 gram, 8.8 mmol, available from Sigma-Aldrich), 1-hydroxybenzotriazole (1.18 gram, 8.7 mmol, available from Sigma-Aldrich) and methylene chloride (500 milliliters). The reaction mixture is cooled to 0° C. and 1-(3-(dimethylamino)propyl)-3-ethylcarbodiimide hydrochloride (16.6 grams, 87 mmol, available from Sigma-Aldrich) is added portionwise. The reaction mixture is stirred at 0° C. for 0.5 hour, followed by stirring at room temperature until the reaction is deemed complete by $^1$H NMR spectroscopy in DMSO-$d_6$ (about 2 hours); the signal corresponding to the methylene protons alpha to the carbonyl groups of 1,12-dodecanedioc acid (4H, triplet at δ2.18) is consumed and is replaced by a triplet at δ2.27 (4H), corresponding to $(H_2C=CHO(CH_2)_4OOCC\underline{H}_2(CH_2)_4)_2$. The reaction mixture is then concentrated in vacuo and the residue is dissolved in ethyl acetate (300 milliliters). The organic layer is washed with saturated sodium bicarbonate (2×150 milliliters) and water (2×150 milliliters), dried over anhydrous sodium sulfate, filtered, and concentrated in vacuo. The crude product is recrystallized from methanol to afford a white solid. The product is believed to be bis(4-(vinyloxy) butyl) dodecanedioate, of the formula

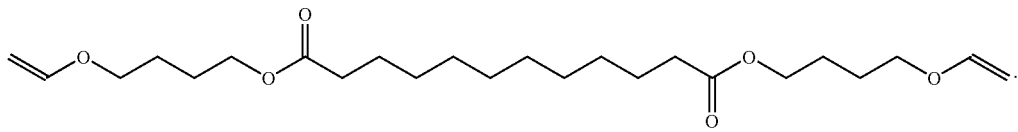

To an aluminum pan is added 59.35 grams of bis(4-(vinyloxy)butyl) trimethyl-1,6-hexanediylbiscarbamate (mixture of 2,2,4- and 2,4,4-isomers), 12.49 grams of bis(4-(vinyloxy) butyl) dodecanedioate, 8.29 grams of R-GEN® BF-1172 (cationic photoinitiator; substituted triarylsulfonium hexafluorophosphate salt in propylene carbonate as a 40% solution; available from Chitec Chemical Co., Ltd., Taiwan, R.O.C.), 11.45 grams of VEctomer® 5015 (available from Sigma-Aldrich) and 12.50 grams of 1-octadecanol (available from Sigma-Aldrich). The mixture is heated with stirring at 100° C. until visually homogenous (about 1 hour). At this point, 0.94 grams of the (unsaturated C-15-phenoxy)-substituted copper phthalocyanine dye prepared in Example IV is added and the mixture is stirred with heating for an additional 1 hour.

The ink is incorporated into a PHASER® 860 printer modified to change the intermediate transfer drum temperature, paper preheating temperature, and ink heating temperature and printed via transfuse onto LUSTROGLOSS® (Sappi Warren Papers) glossy coated paper and HAMMERMILL® (International Paper) and XEROX® 4024 uncoated papers. It is believed that all of the prints will show evidence of UV-induced polymerization (i.e., an increase in robustness as determined by rub and scratch) when exposed to light from a UV Fusion LC-6B Benchtop Conveyor equipped with UV Fusion F300S Ultraviolet Lamp System employing an "H" bulb for about 3 seconds.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a phase change ink carrier and a colorant compound of the formula

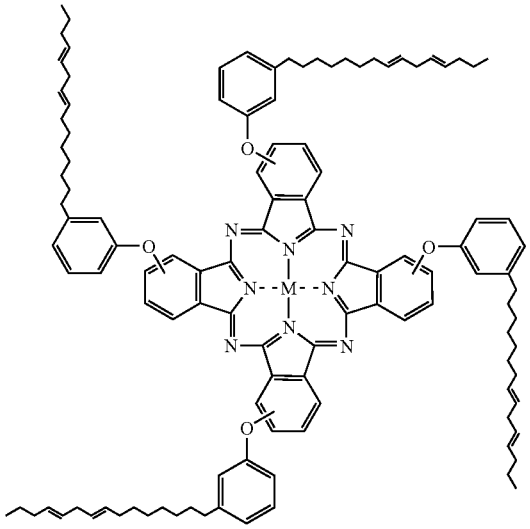

wherein M is an atom or group of atoms capable of bonding to the central cavity of a phthalocyanine molecule, wherein axial ligands optionally can be attached to M.

2. An ink according to claim 1 wherein M is dihydrogen, dilithium, disodium, dipotassium, beryllium, magnesium, calcium, strontium, barium, chromium, iron, cobalt, nickel, zinc, tin, lead, cadmium, manganese, iron, or mixtures thereof.

3. An ink according to claim 1 wherein M is copper.

4. An ink according to claim 1 wherein M is a divalent halometal or -metalloid group.

5. An ink according to claim 1 wherein M is a divalent oxometal group.

6. An ink according to claim 1 wherein M is a hydroxymetal group.

7. An ink according to claim 1 wherein M is a divalent metal- or metalloidal-oxyhydrocarbon group.

8. An ink according to claim 1 wherein the colorant compound is derived from 4-nitrophthalonitrile.

9. An ink according to claim 1 wherein the colorant compound is derived from 3-nitrophthalonitrile.

10. An ink according to claim 1 wherein the colorant compound is of the formula

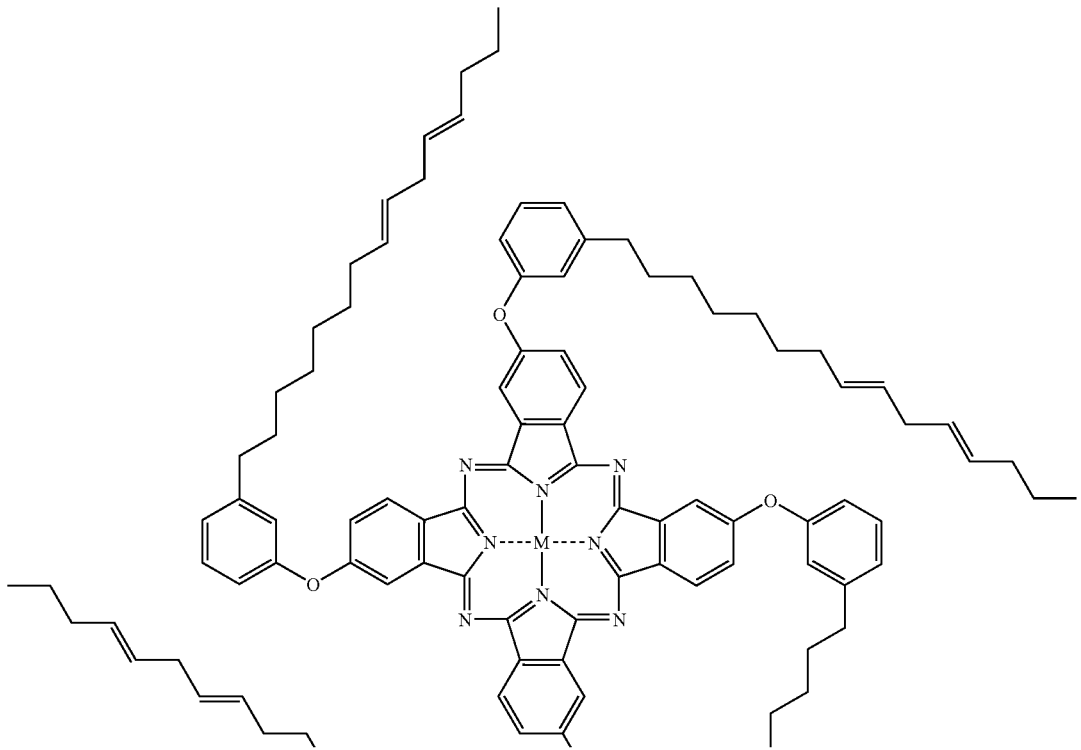

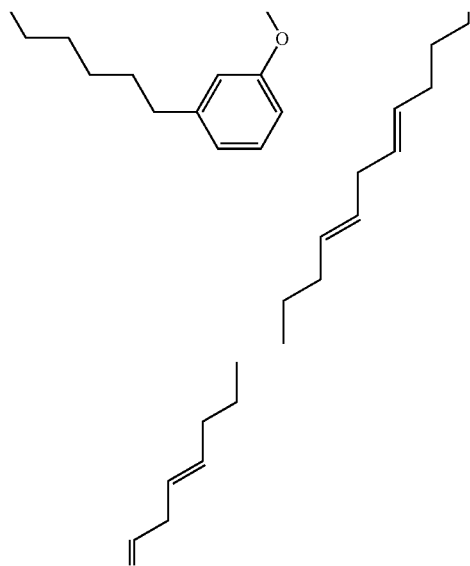

-continued
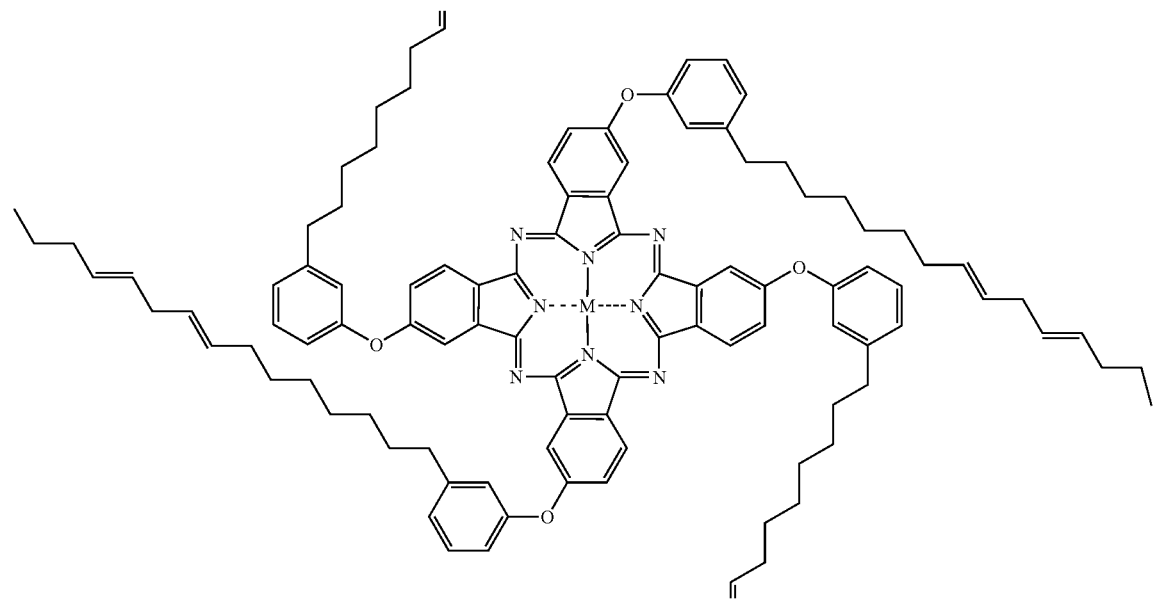
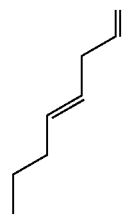
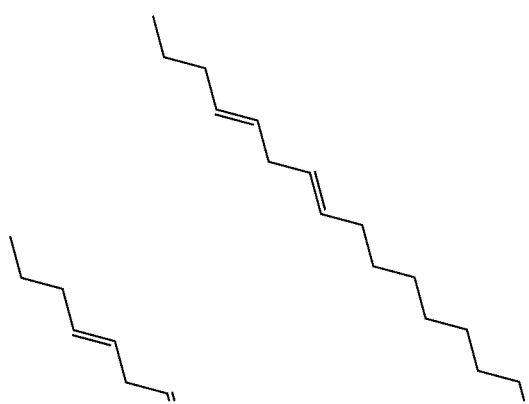

-continued
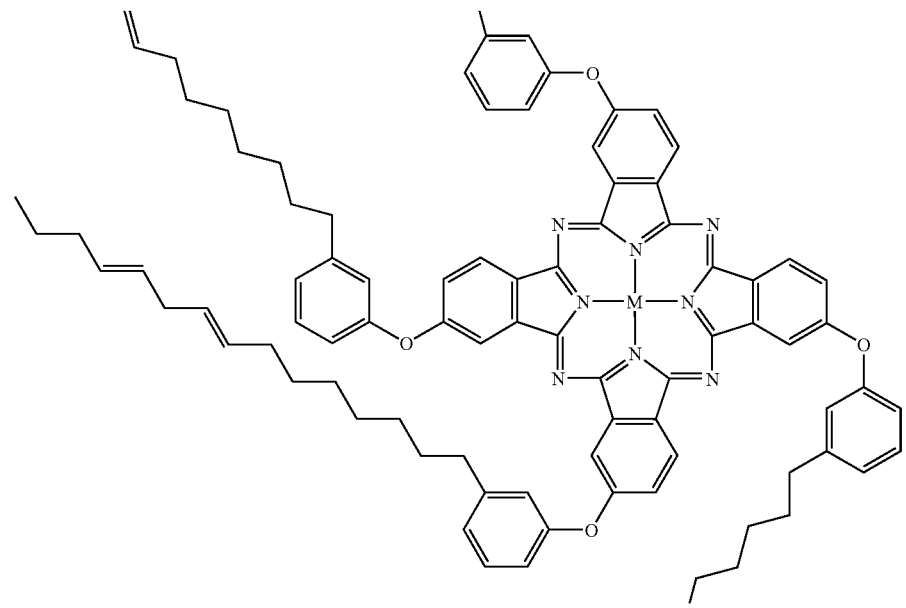
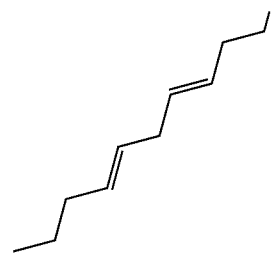
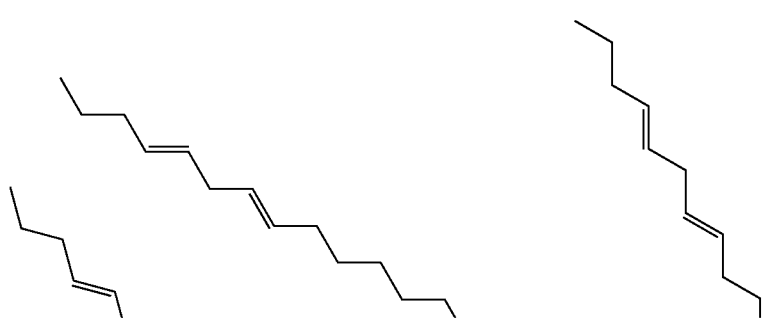

-continued
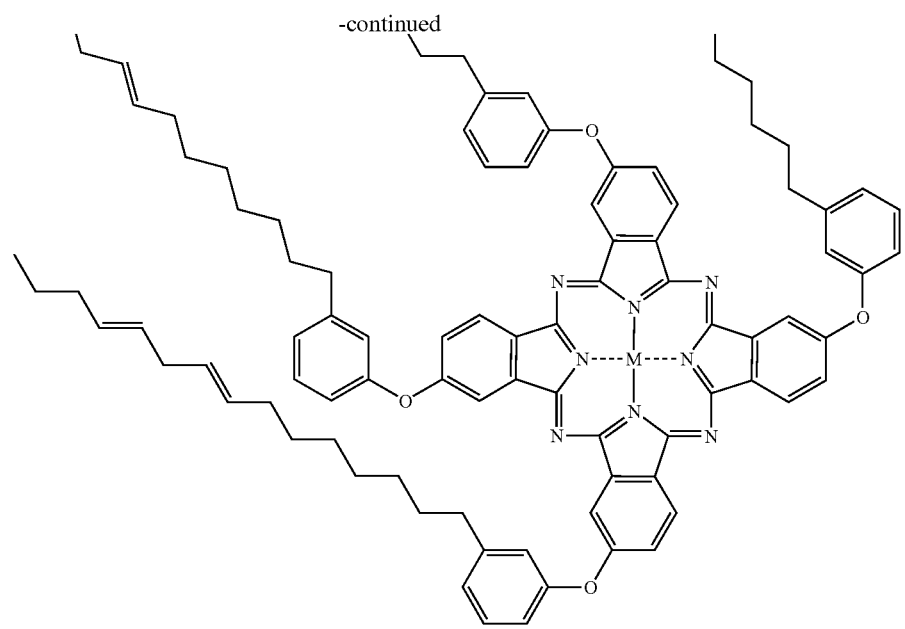
or mixtures thereof.
11. An ink according to claim 1 wherein the colorant compound is of the formula
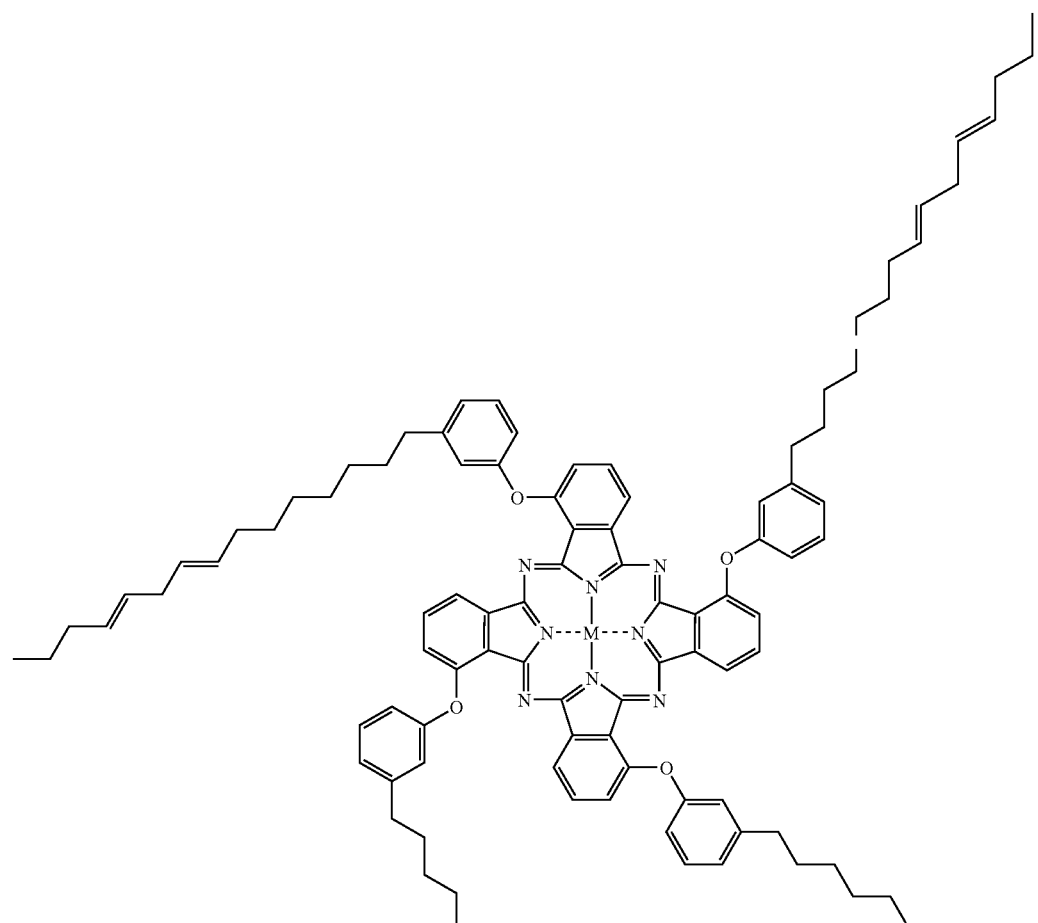

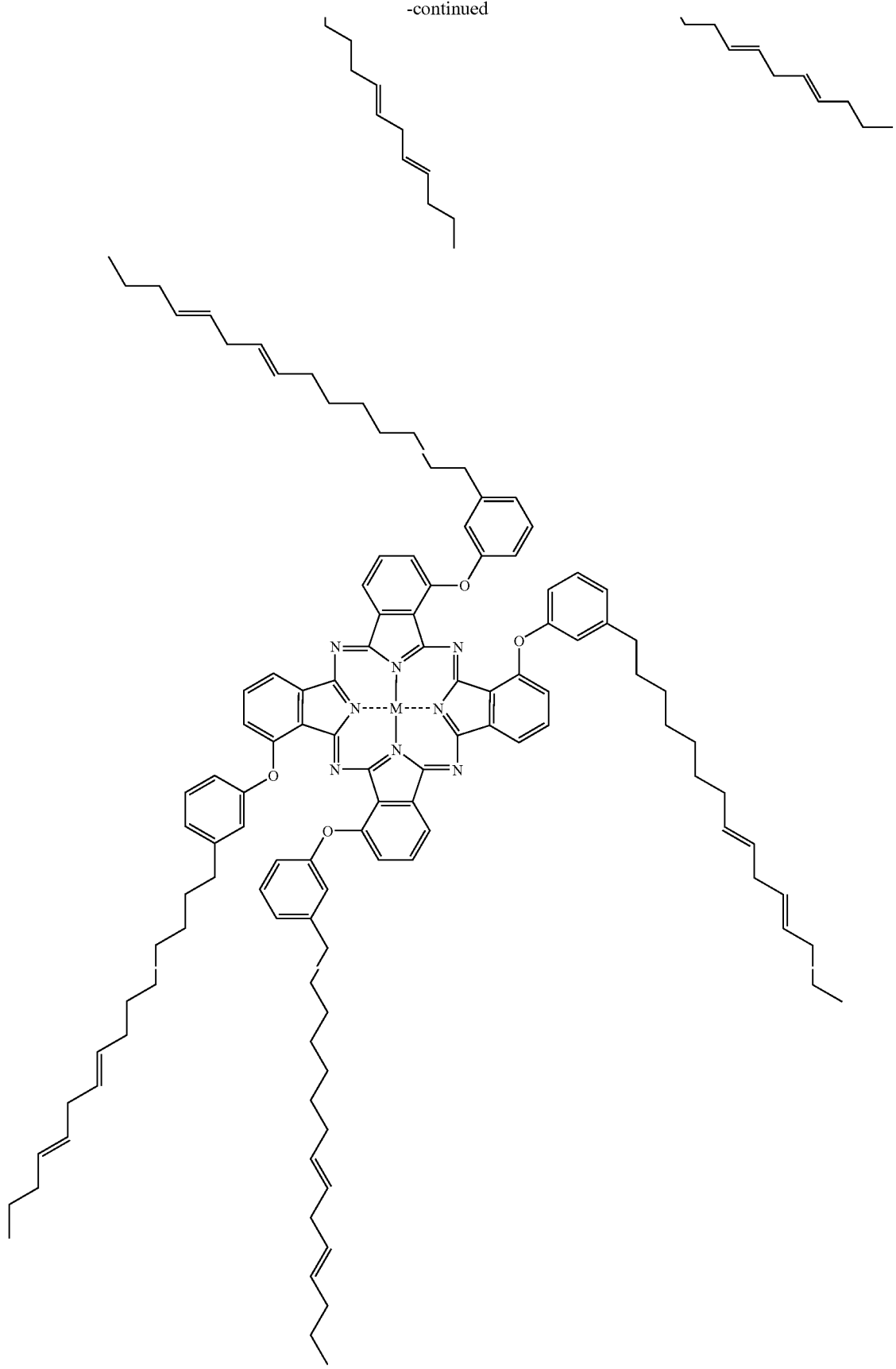

-continued
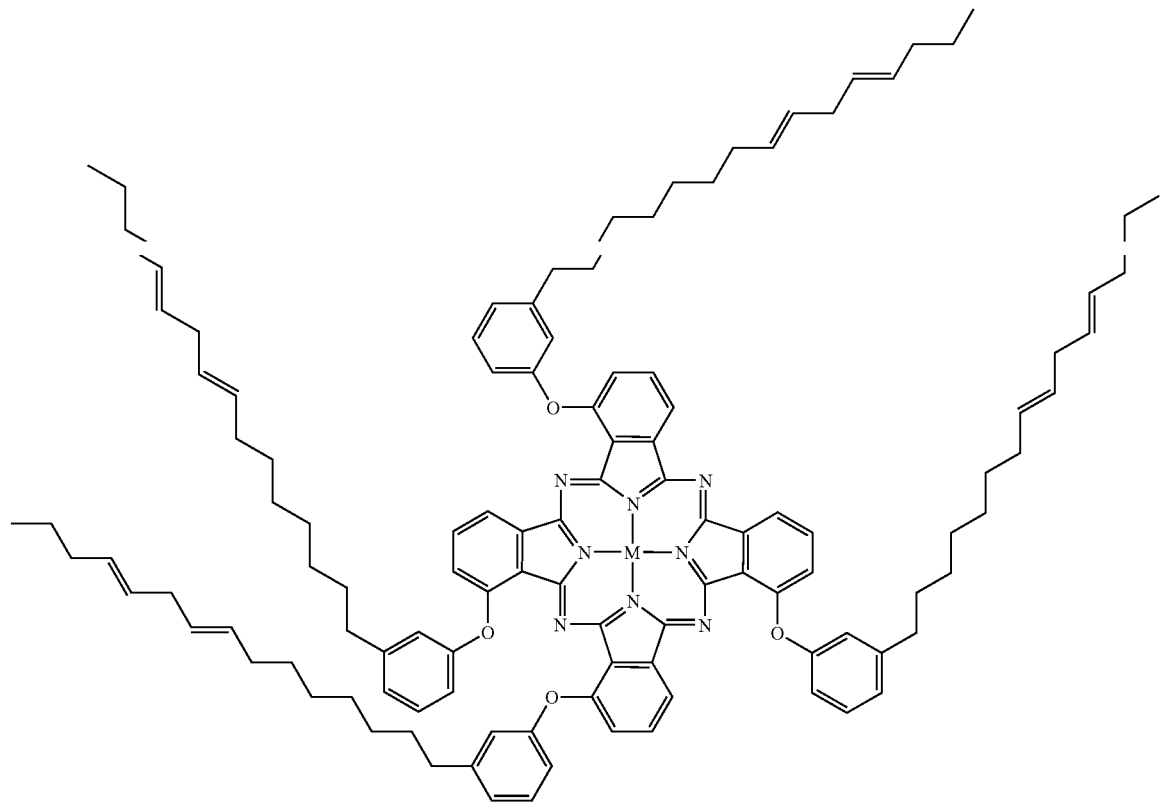
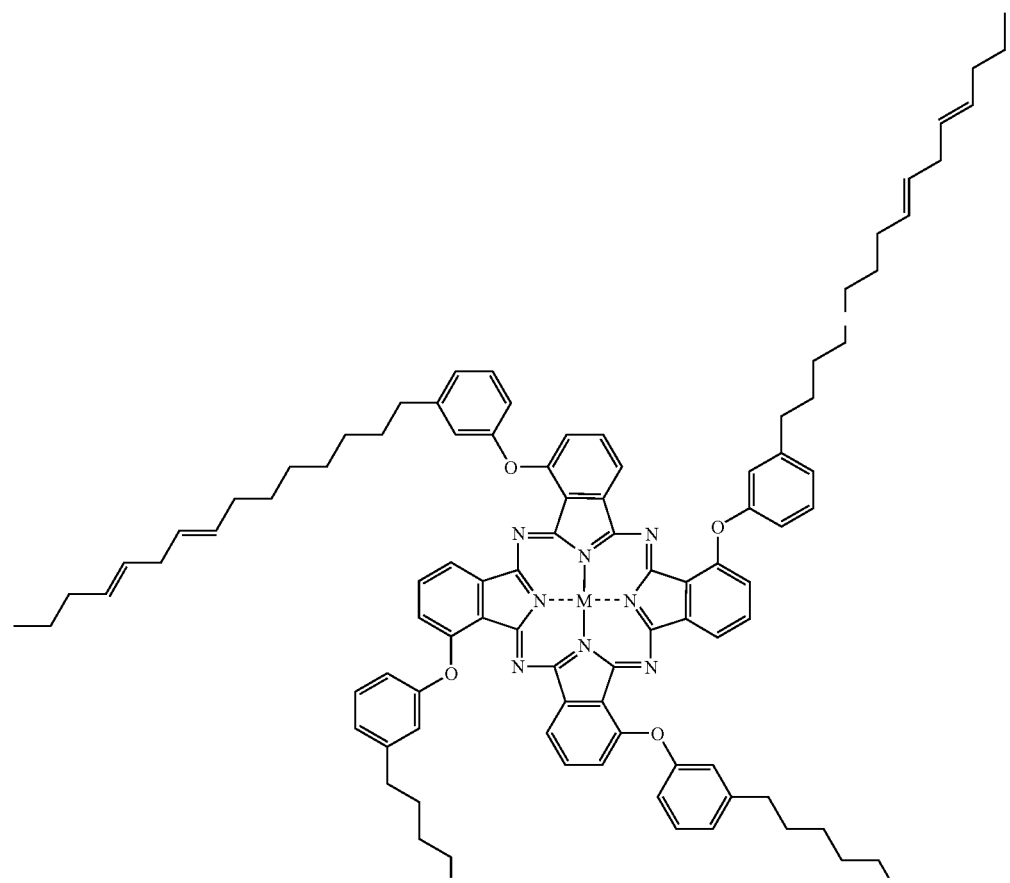

-continued
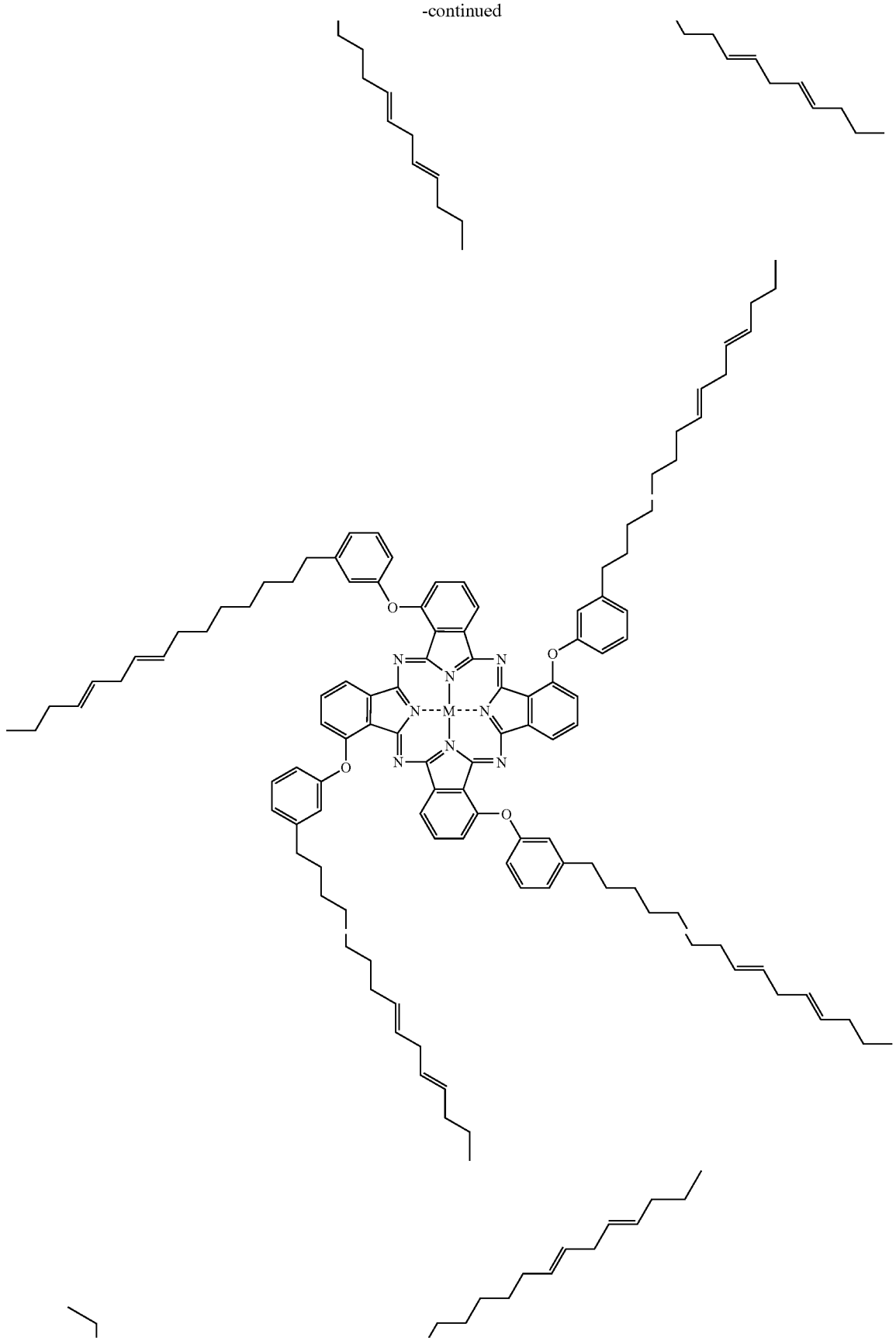

-continued
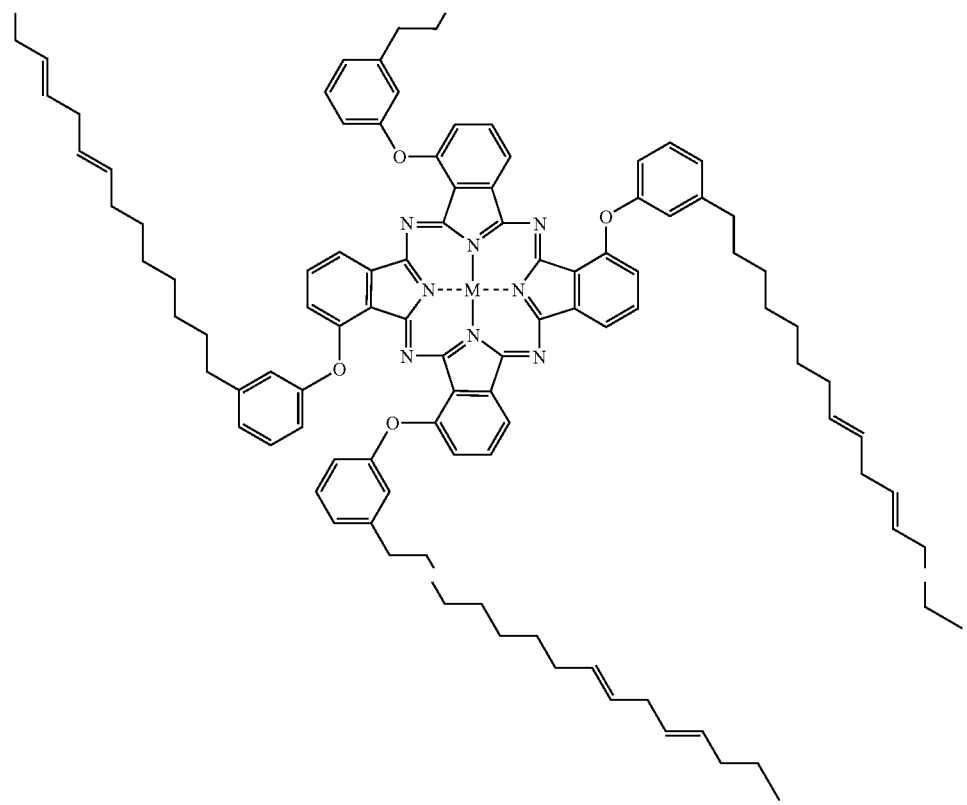
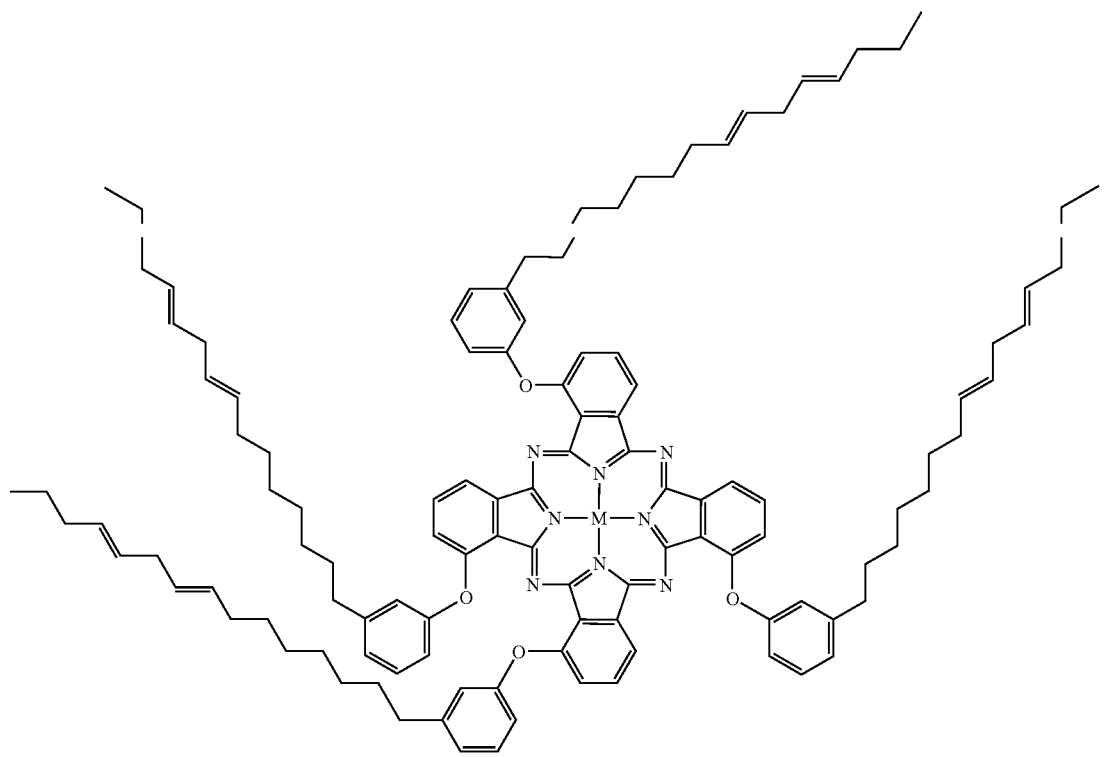

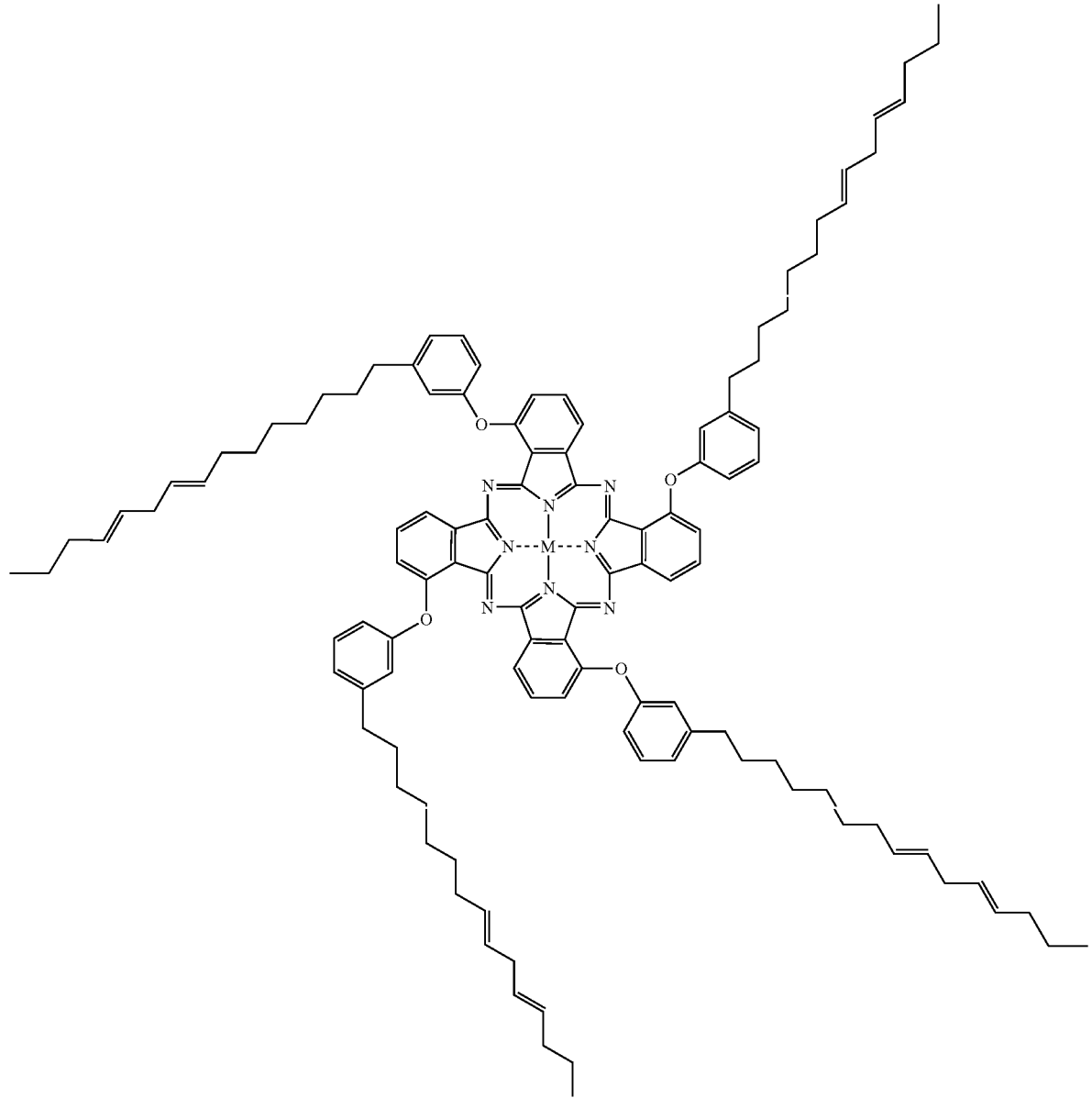

or mixtures thereof.

12. An ink according to claim 1 wherein the phase change ink carrier comprises a monoamide, a branched triamide, a tetra-amide, or a mixture thereof.

13. An ink according to claim 1 wherein the phase change ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol.

14. An ink according to claim 1 wherein the phase change ink carrier comprises (a) a polyethylene wax, (b) a stearyl stearamide wax, (c) a branched triamide of the formula

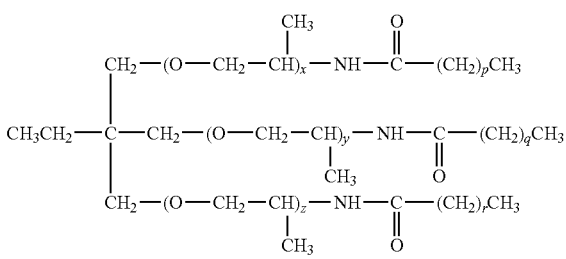

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

15. An ink according to claim 1 wherein the colorant is present in the ink in an amount of at least about 0.1 percent by weight.

16. An ink according to claim 1 wherein the colorant is present in the ink in an amount of no more than about 20 percent by weight.

17. A process which comprises (1) incorporating into an ink jet printing apparatus a phase change ink comprising a phase change ink carrier and a colorant compound of the formula wherein M is an atom or group of atoms capable of bonding to the central cavity of a phthalocyanine molecule, wherein axial ligands optionally can be attached to M; (2) melting the ink; and (3) causing droplets of the melted ink to be ejected in an imagewise pattern onto a substrate.

18. A process according to claim 17 wherein the printing apparatus employs a piezoelectric printing process wherein droplets of the ink are caused to be ejected in imagewise pattern by oscillations of piezoelectric vibrating elements.

19. A process according to claim 17 wherein the substrate is a final recording sheet and droplets of the melted ink are ejected in an imagewise pattern directly onto the final recording sheet.

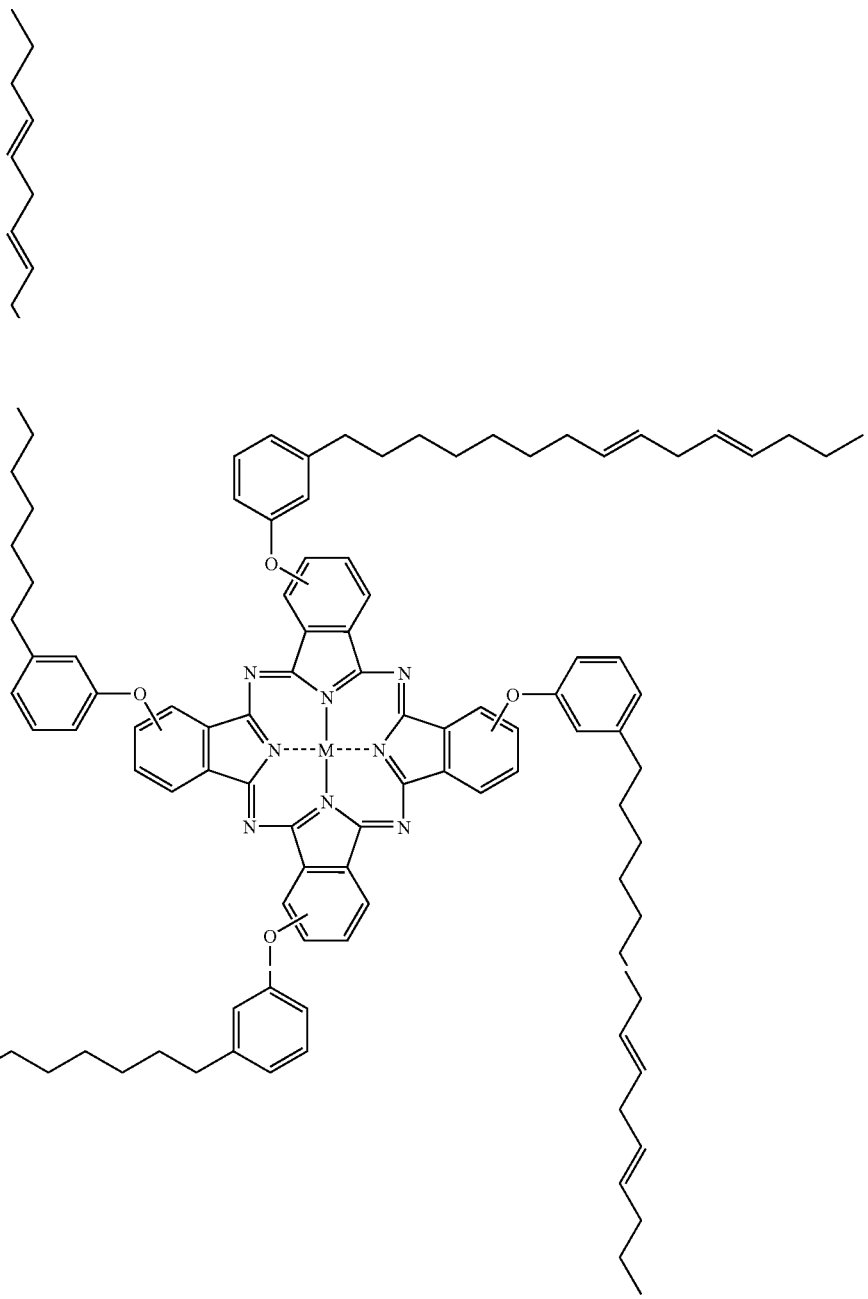

20. A process according to claim 17 wherein the substrate is an intermediate transfer member and droplets of the melted ink are ejected in an imagewise pattern onto the intermediate transfer member followed by transfer of the imagewise pattern from the intermediate transfer member to a final recording sheet.

21. A process according to claim 20 wherein the intermediate transfer member is heated to a temperature above that of the final recording sheet and below that of the melted ink in the printing apparatus.

22. A process according to claim 20 wherein both the intermediate transfer member and the final recording sheet are heated to a temperature below that of the melted ink in the printing apparatus, and wherein the final recording sheet is heated to a temperature above that of the intermediate transfer member and below that of the melted ink in the printing apparatus.

23. A process according to claim 20 wherein both the intermediate transfer member and the final recording sheet are heated to a temperature below that of the melted ink in the printing apparatus, and wherein the intermediate transfer member is heated to a temperature above that of the final recording sheet and below that of the melted ink in the printing apparatus.

24. A radiation curable ink composition comprising (a) an ink vehicle, said ink vehicle comprising at least one radically curable monomer compound, and (b) a colorant compound of the formula

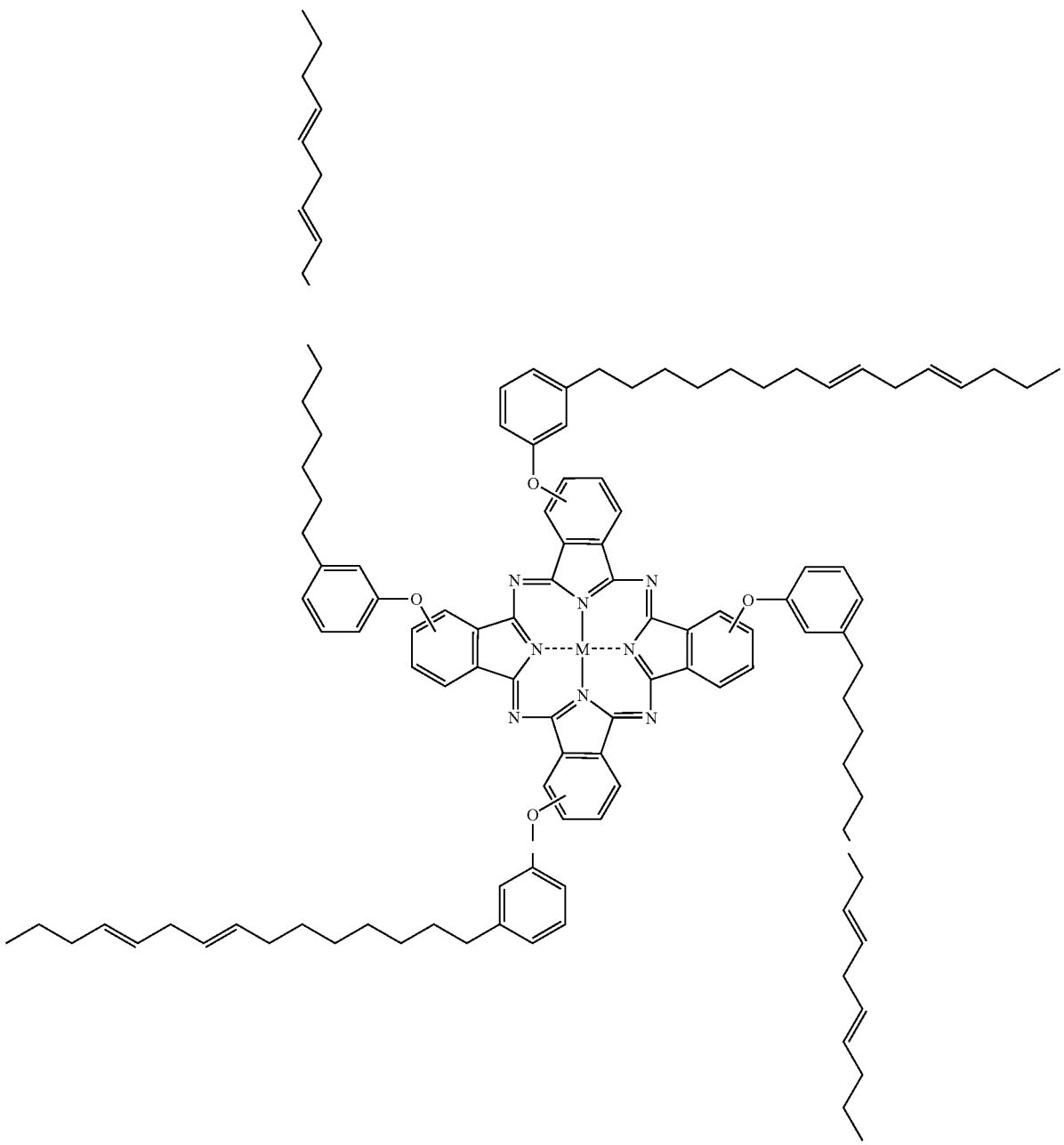

wherein M is an atom or group of atoms capable of bonding to the central cavity of a phthalocyanine molecule, wherein axial ligands optionally can be attached to M.

25. An ink according to claim 24 wherein M is dihydrogen, dilithium, disodium, dipotassium, beryllium, magnesium, calcium, strontium, barium, chromium, iron, cobalt, nickel, zinc, tin, lead, cadmium, manganese, iron, or mixtures thereof.

26. An ink according to claim 24 wherein M is copper.

27. An ink according to claim 24 wherein M is a divalent halometal or -metalloid group.

28. An ink according to claim 24 wherein M is a divalent oxometal group.

29. An ink according to claim 24 wherein M is a hydroxymetal group.

30. An ink according to claim 24 wherein M is a divalent metal- or metalloidal-oxyhydrocarbon group.

31. An ink according to claim 24 wherein the colorant compound is derived from 4-nitrophthalonitrile.

32. An ink according to claim 24 wherein the colorant compound is derived from 3-nitrophthalonitrile.

33. An ink according to claim 24 wherein the colorant compound is of the formula

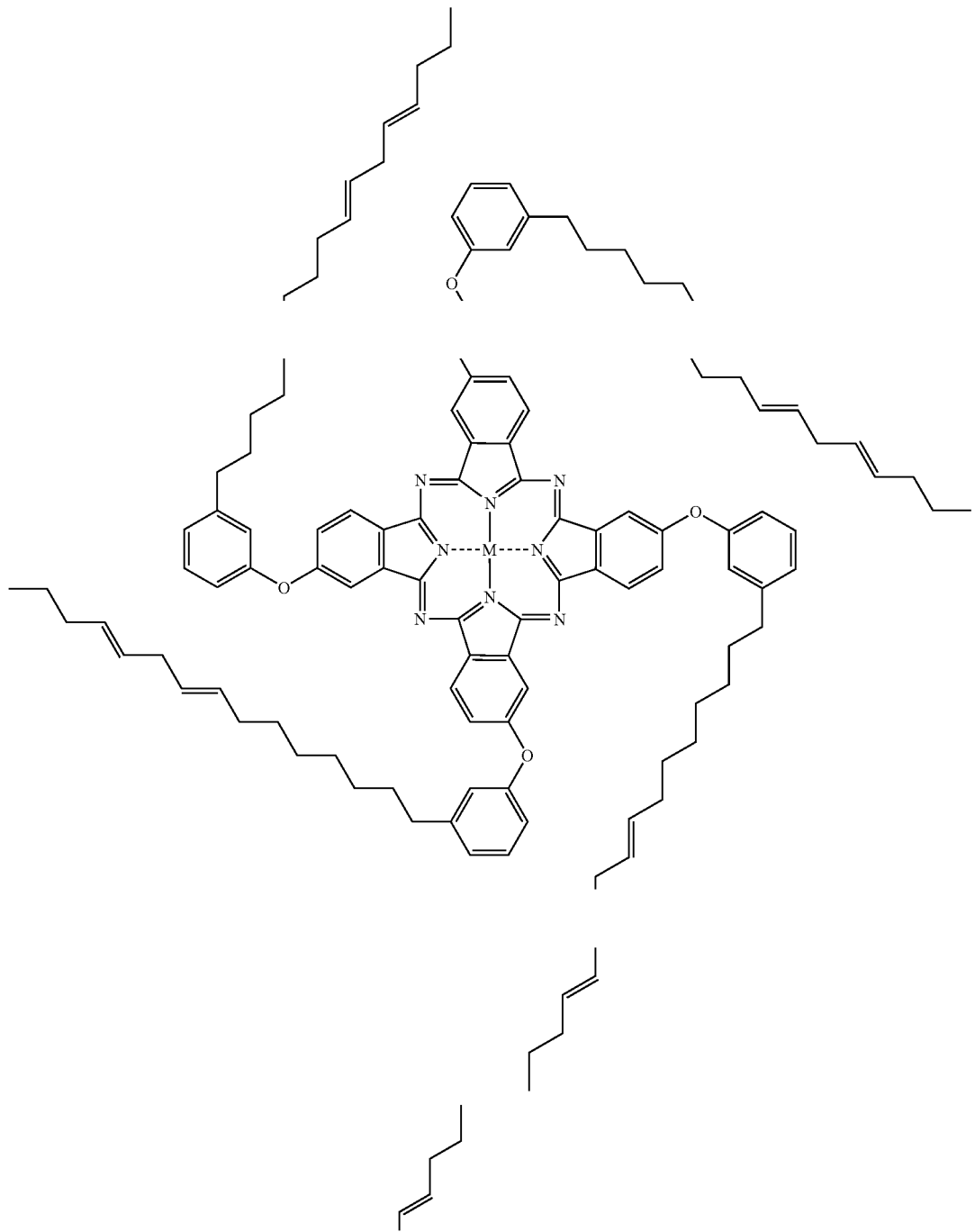

-continued
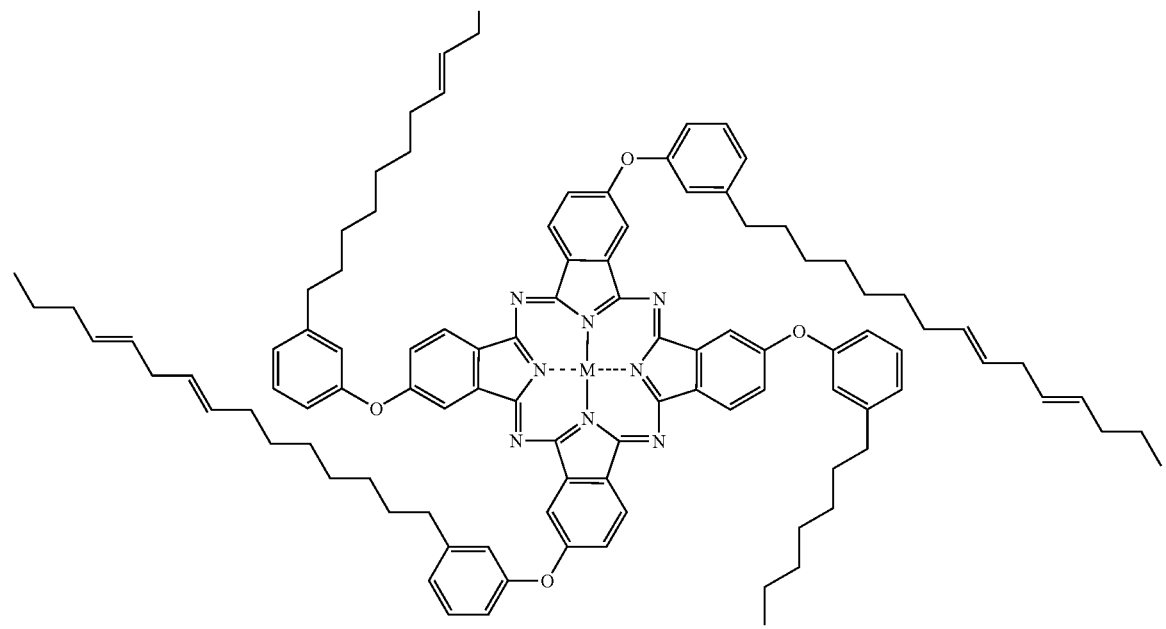
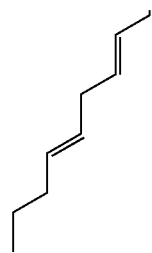
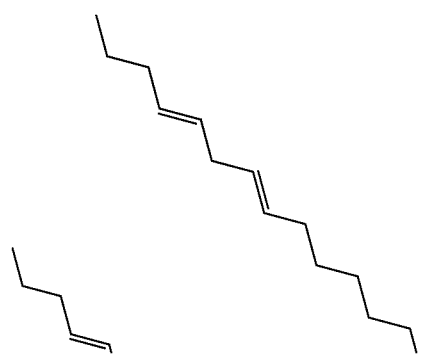

-continued
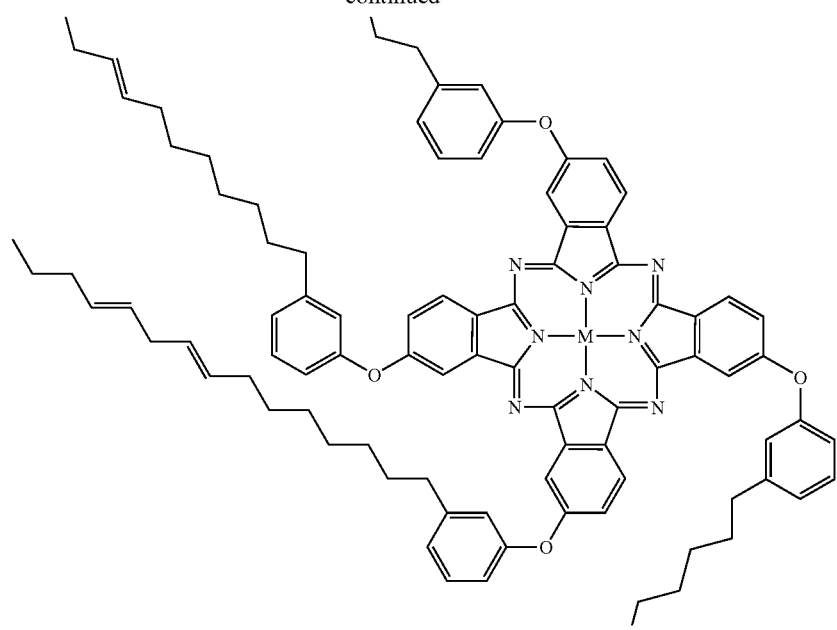
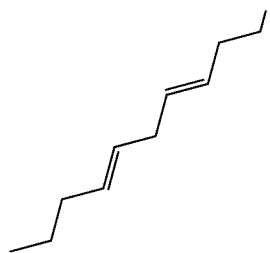
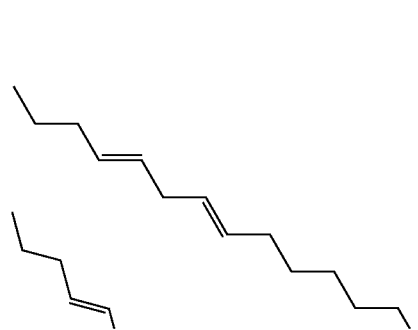
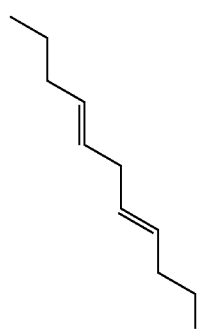

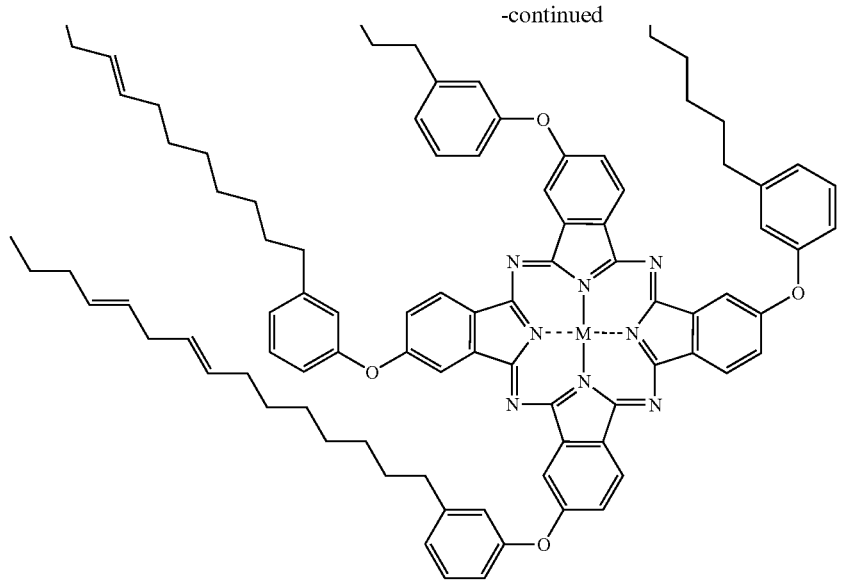
25
or mixtures thereof.
34. An ink according to claim 24 wherein the colorant compound is of the formula
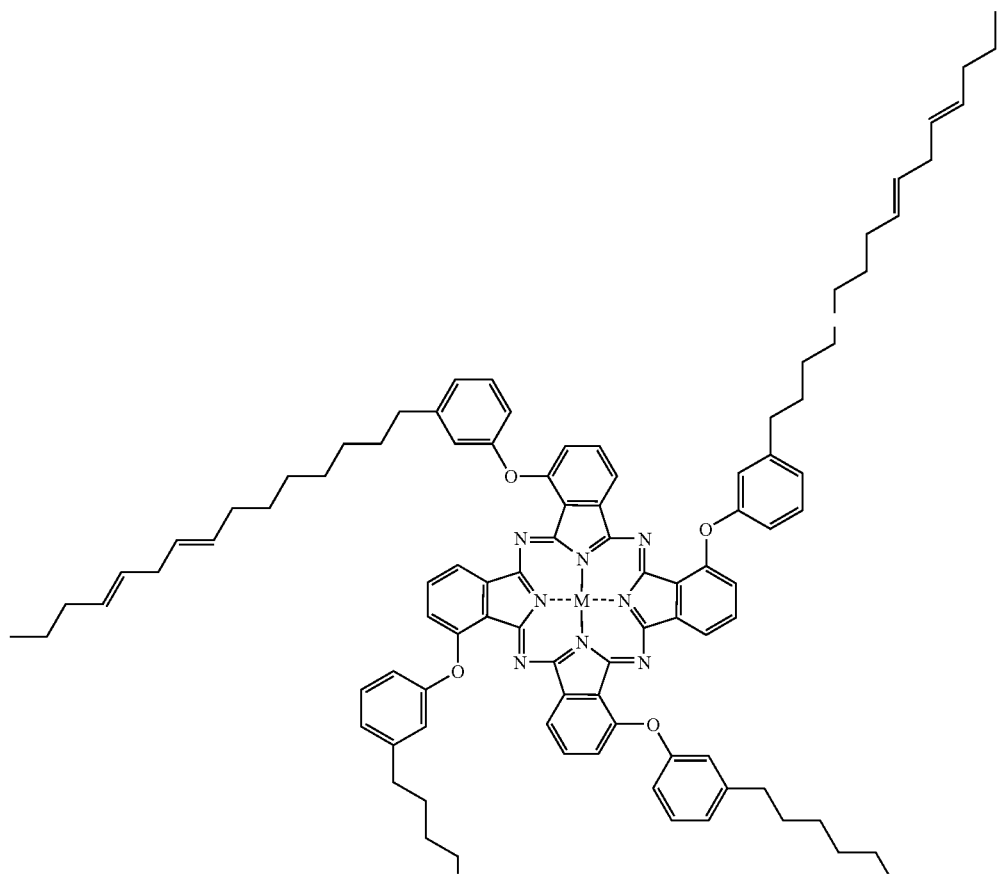

-continued
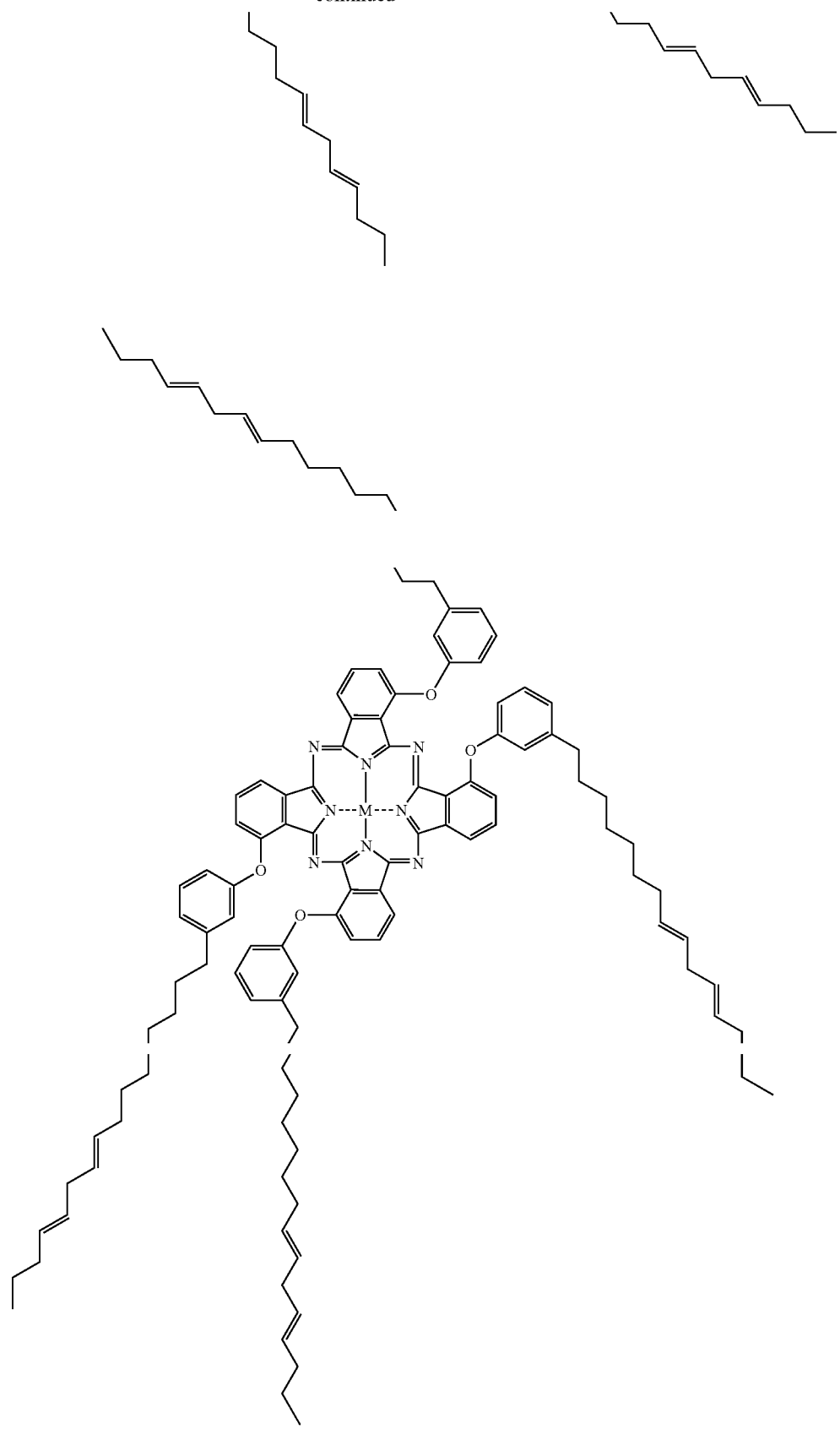

-continued
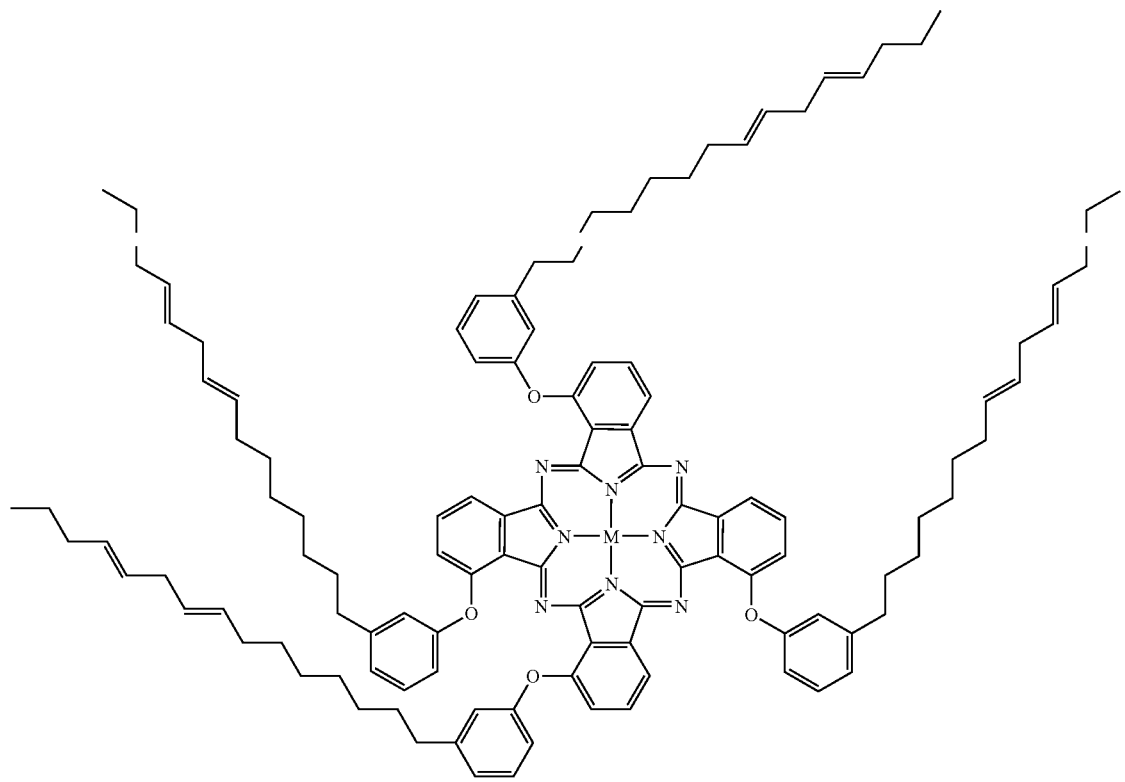
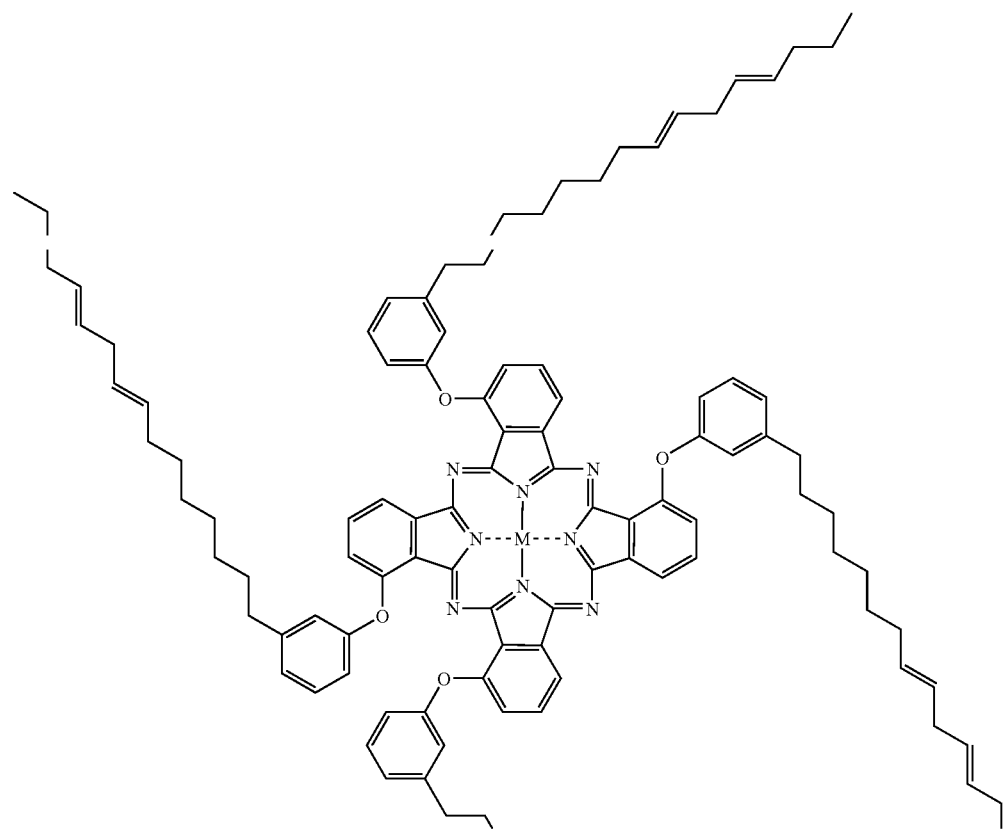

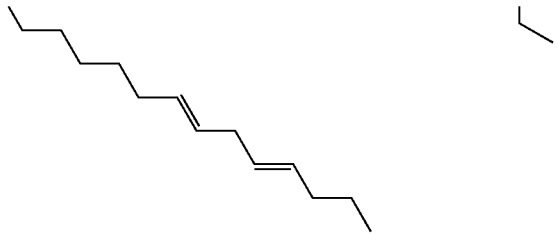

or mixtures thereof.

35. An ink according to claim 24 wherein the radically curable monomer compound is chosen from acrylates, methacrylates, and mixtures thereof.

36. An ink according to claim 24 further containing an initiator.

37. An ink according to claim 24 further containing an amine synergist.

38. An ink according to claim 24 wherein the ink is a solid at 25° C.

39. An ink according to claim 24 further comprising a monoamide, a branched triamide, a tetra-amide, or a mixture thereof.

40. An ink according to claim 24 further comprising (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol.

41. An ink according to claim 24 further comprising (a) a polyethylene wax, (b) a stearyl stearamide wax, (c) a branched triamide of the formula

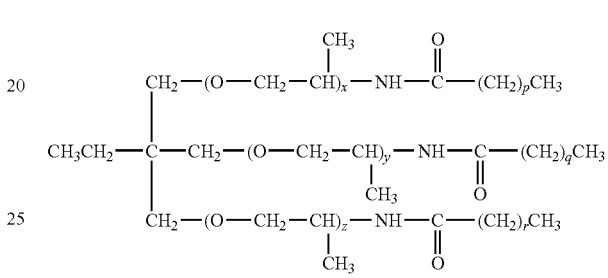

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

42. An ink according to claim 24 wherein the colorant is present in the ink in an amount of at least about 0.1 percent by weight.

43. An ink according to claim 24 wherein the colorant is present in the ink in an amount of no more than about 20 percent by weight.

44. A process which comprises (1) applying a radiation curable ink composition comprising (a) an ink vehicle, said ink vehicle comprising at least one radically curable monomer compound, and (b) a colorant compound of the formula

-continued

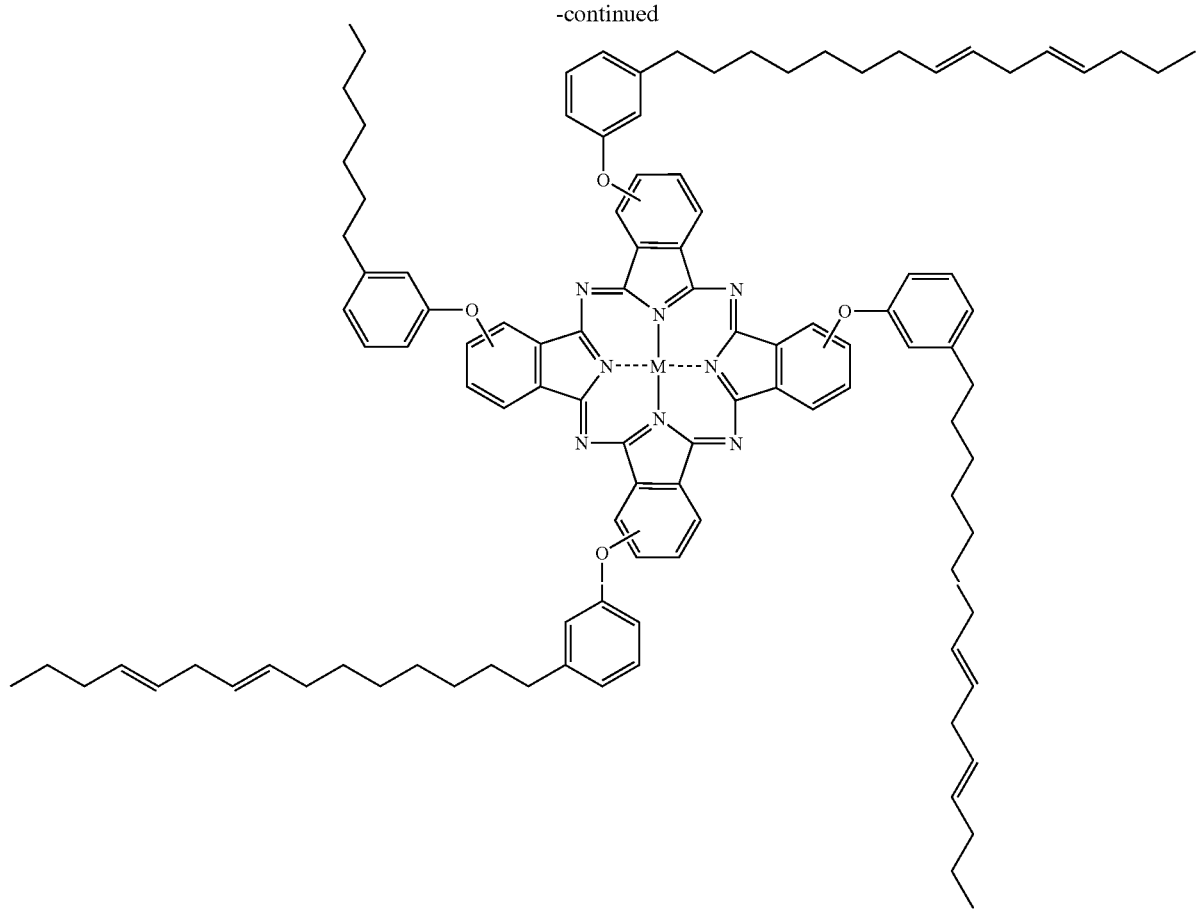

wherein M is an atom or group of atoms capable of bonding to the central cavity of a phthalocyanine molecule, wherein axial ligands optionally can be attached to M in an imagewise pattern onto a substrate; and (2) exposing the imagewise pattern to heat and/or actinic radiation.

45. A process according to claim 44 wherein the ink is a phase change ink and the process comprises incorporating the ink into an ink jet printer, melting the ink, causing droplets of the melted ink to be ejected in an imagewise pattern onto a substrate, and exposing the imagewise pattern to heat and/or actinic radiation.

46. A process according to claim 45 wherein the printing apparatus employs a piezoelectric printing process wherein droplets of the ink are caused to be ejected in imagewise pattern by oscillations of piezoelectric vibrating elements.

47. A process according to claim 45 wherein the substrate is a final recording sheet and droplets of the melted ink are ejected in an imagewise pattern directly onto the final recording sheet and the imagewise pattern on the final recording sheet is exposed to heat and/or actinic radiation.

48. A process according to claim 45 wherein the substrate is an intermediate transfer member and droplets of the melted ink are ejected in an imagewise pattern onto the intermediate transfer member followed by transfer of the imagewise pattern from the intermediate transfer member to a final recording sheet, and wherein the imagewise pattern on the final recording sheet is exposed to heat and/or actinic radiation.

49. A process according to claim 48 wherein the intermediate transfer member is heated to a temperature above that of the final recording sheet and below that of the melted ink in the printing apparatus.

50. A process according to claim 48 wherein the intermediate transfer member is heated to a temperature of from about 4° C. above to about 60° C. below the ink melting temperature.

51. A process according to claim 48 wherein the intermediate transfer member is heated to a temperature of from about 2° C. above to about 50° C. below the ink melting temperature.

* * * * *